United States Patent
Kletti et al.

(10) Patent No.: US 12,499,378 B2
(45) Date of Patent: Dec. 16, 2025

(54) FAIRNESS UTILITY TRADE-OFF IN RANKING AS A GEOMETRIC PROJECTION PROBLEM

(71) Applicant: NAVER CORPORATION, Gyeonggi-do (KR)

(72) Inventors: Till Kletti, La Tronche (FR); Jean-Michel Renders, Quaix en Chartreuse (FR)

(73) Assignee: NAVER CORPORATION, Gyeonggi-do (KR)

( * ) Notice: Subject to any disclaimer, the term of this patent is extended or adjusted under 35 U.S.C. 154(b) by 1063 days.

(21) Appl. No.: 17/530,883

(22) Filed: Nov. 19, 2021

(65) Prior Publication Data

US 2023/0162065 A1     May 25, 2023

(51) Int. Cl.
  *G06F 16/00* (2019.01)
  *G06N 7/01* (2023.01)
  *G06Q 30/0601* (2023.01)

(52) U.S. Cl.
  CPC ........... *G06N 7/01* (2023.01); *G06Q 30/0625* (2013.01)

(58) Field of Classification Search
  CPC ....................................................... G06F 16/27
  See application file for complete search history.

(56) References Cited

U.S. PATENT DOCUMENTS

| | | | |
|---|---|---|---|
| 10,007,719 B2 * | 6/2018 | Horvitz | G06F 16/332 |
| 11,481,659 B1 * | 10/2022 | Perrone | G06N 3/08 |
| 11,948,102 B2 * | 4/2024 | Tristan | G06N 20/20 |
| 2004/0073538 A1 | 4/2004 | Leishman et al. | |
| 2018/0046967 A1 | 2/2018 | Ghosh et al. | |
| 2020/0372035 A1 * | 11/2020 | Tristan | G06F 18/2415 |
| 2020/0372435 A1 * | 11/2020 | Kenthapadi | G06F 16/90335 |
| 2022/0050848 A1 * | 2/2022 | Panda | G06F 16/24578 |
| 2025/0068637 A1 * | 2/2025 | Kannadasan | G06F 16/24578 |

OTHER PUBLICATIONS

Low-discrepancy sequence, Dec. 2020. Page Version ID: 993584035, retrieved on Internet at https://en.wikipedia.org/w/index.php?title=Lowdiscrepancy_sequence&oldid=993584035.

demofox2. Weighted Round Robin (Weighted Random Integers) Using The Golden Ratio Low Discrepancy Sequence, Jun. 2020 retrieved from internet at https://blog.demofox.org/2020/06/23/weighted-round-robin-using-the-golden-ratio-low-discrepancy-sequence/2021.

Agarwal, Alekh, Miroslav Dudik, and Zhiwei Steven Wu. 'Fair Regression: Quantitative Definitions and Reduction-Based Algorithms'. Published on arXiv as 190512843, May 29, 2019. http://arxiv.org/abs/1905.12843.

(Continued)

*Primary Examiner* — Khanh B Pham

(57) ABSTRACT

A ranking system includes: an exposure module configured to, in response to receiving an input from a computing device via a network, determine, based on an anisotropic intensity value and using a Dynamic Bayesian Network (DBM) exposure model, an exposure value for ranking items for output via the computing device, where the anisotropic intensity value corresponds to a tradeoff between utility to users and fairness to item producers; a ranking module configured to generate a ranking of the items based on the exposure value; and a response module configured to transmit a response including the ranking of the items to the computing device via the network.

25 Claims, 10 Drawing Sheets

(56) References Cited

OTHER PUBLICATIONS

Biega Asia J., Fernando Diaz, Michael D. Ekstrand, and Sebastian Kohlmeier. 2020. Overview of the TREC 2020 Fair Ranking Track. In The Twenty-Eighth Text REtrieval Conference (TREC 2020) Proceedings https://arxiv.org/pdf/2108.05135.pdf.

Biega, Asia J., Krishna P. Gummadi, and Gerhard Weikum. 'Equity of Attention: Amortizing Individual Fairness in Rankings'. The 41st International ACM SIGIR Conference on Research & Development in Information Retrieval 405-14, Jun. 27, 2018 https://doi.org/10.1145/3209978.3210063.

Caratheodory, C. in Giittingen. 'Uber den Variabilitatsbereich der Koeffizienten yon Potenzreihen, die gegebene Werte nichT annehmen.', 1907 https://doi.org/10.1007/BF01449883.

Caton Simon and Haas Christian. Fairness in machine learning: A survey, 2020. Published on arXiv as 202104053, Oct. 4, 2020 https://arxiv.org/pdf/2010.04053.pdf.

Chapelle, Olivier, Donald Metlzer, Ya Zhang, and Pierre Grinspan. 'Expected Reciprocal Rank for Graded Relevance'. In Proceeding of the 18th ACM Conference on Information and Knowledge Management—CIKM '09, 621. Hong Kong, China: ACM Press, 2009. https://doi.org/10.1145/1645953.1646033.

Chapelle, Olivier, and Ya Zhang. 'A Dynamic Bayesian Network Click Model for Web Search Ranking'. In Proceedings of the 18th International Conference on World Wide Web—WWW '09, 1. Madrid, Spain: ACM Press, 2009. https://doi.org/10.1145/1526709.1526711.

Chuklin, Aleksandr, Ilya Markov, and Maarten de Rijke. 'Click Models for Web Search' Synthesis Lectures on Information Concepts, Retrieval, and Services 7, No. 3 (Jul. 15, 2015): 1-115. 2015 https://doi.org/10.2200/S00654ED1V01Y201507ICR043.

Diaz, Fernando, Bhaskar Mitra, Michael D. Ekstrand, Asia J. Biega, and Ben Carterette. 'Evaluating Stochastic Rankings with Expected Exposure'. In Proceedings of the 29th ACM International Conference on Information & Knowledge Management, 275-84. Virtual Event Ireland: ACM, 2020. https://doi.org/10.1145/3340531.3411962.

Do, Virginie, Sam Corbett-Davies, Jamal Atif, and Nicolas Usunier. 'Online Certification of Preference-Based Fairness for Personalized Recommender Systems'. Published on arXiv as 210414527, Apr. 2021. http://arxiv.org/abs/2104.14527.

Dufossé, Fanny, Kamer Kaya, Ioannis Panagiotas, and Bora Uçar. 'Further Notes on Birkhoff-von Neumann Decomposition of Doubly Stochastic Matrices'. Linear Algebra and Its Applications 554: 68-78. Oct. 2018 https://doi.org/10.1016/j.laa.2018.05.017.

Dufossé, Fanny, and Bora Uçar. 'Notes on Birkhoff-von Neumann Decomposition of Doubly Stochastic Matrices'. Linear Algebra and Its Applications 497 (May 2016): 108-15. 2016 https://doi.org/10.1016/j.laa.2016.02.023.

Duncan Luce R.. Individual Choice Behavior: A Theoretical Analysis. Dover Publications, Chapitre 2.F. Rank Orderings. Mineola, N.Y, Jan. 2005.

Dwork, Cynthia, Moritz Hardt, Toniann Pitassi, Omer Reingold, and Richard Zemel. 'Fairness through Awareness'. In Proceedings of the 3rd Innovations in Theoretical Computer Science Conference on—ITCS '12, 214-26. Cambridge, Massachusetts: ACM Press, 2012. https://doi.org/10.1145/2090236.2090255.

Geyik, Sahin Cem, Stuart Ambler, and Krishnaram Kenthapadi. 'Fairness-Aware Ranking in Search & Recommendation Systems with Application to LinkedIn Talent Search'. In Proceedings of the 25th ACM SIGKDD International Conference on Knowledge Discovery & Data Mining, 2221-31. Anchorage AK USA: ACM, 2019. https://doi.org/10.1145/3292500.3330691.

Grotschel, Martin Laszlo Lovasz, and Alexander Schrijver. Geometric Algorithms and Combinatorial Optimization. Reference to Theorem 6.5.11 and its proof in chapter 6: Rational Polyhedra. Springer Science & Business Media, Dec. 2012. https://link.springer.com/content/pdf/bfm:978-3-642-97881-4/1?pdf=chapter%20toc.

Hoeksma, Ruben, Bodo Manthey, and Marc Uetz. 'Efficient Implementation of Carathéodory's Theorem for the Single Machine Scheduling Polytope'. Discrete Applied Mathematics 215 (Dec. 2016): 136-45. 2016 https://doi.org/10.1016/j.dam.2016.06.031.

Järvelin, Kalervo, and Jaana Kekäläinen. 'Cumulated Gain-Based Evaluation of IR Techniques'. ACM Transactions on Information Systems 20, No. 4 (Oct. 2002): 422-46. 2022 https://doi.org/10.1145/582415.582418.

Kletti, Till, and Jean-Michel Renders. 'Naver Labs Europe at TREC 2020 Fair Ranking Track', p. 4, 2020.

Kletti, Till, Jean-Michel Renders, and Patrick Loiseau. 'Introducing the Expohedron for Efficient Pareto-Optimal Fairness-Utility Amortizations in Repeated Rankings'. In Proceedings of the Fifteenth ACM International Conference on Web Search and Data Mining, 498-507. Virtual Event AZ USA: ACM, 2022. https://doi.org/10.1145/3488560.3498490.

Kletti, Till. 'Introducing the Expohedron for Efficient Pareto-Optimal Fairness-Utility Amortizations in Repeated Rankings'. In Proceedings of the Fifteenth ACM International Conference on Web Search and Data Mining, 498-507. Virtual Event AZ USA: ACM, 2022. https://doi.org/10.1145/3488560.3498490.

Kobus, Catherine, Josep Crego, and Jean Senellart. 'Domain Control for Neural Machine Translation'. arXiv, Sep. 12, 2017. http://arxiv.org/abs/1612.06140.

Marcus M.and R. Ree. 1959. Diagonals of doubly stochastic matrices. The Quarterly Journal of Mathematics 10, 1 (Jan. 1959), 296-302. 1959.

Marshall, Albert W., Ingram Olkin, and Barry C. Arnold. Inequalities: Theory of Majorization and Its Applications. Chapter 1: Introduction . Springer Series in Statistics. New York, NY: Springer New York, 2011. https://doi.org/10.1007/978-0-387-68276-1.

Moffat, Alistair, and Justin Zobel. 'Rank-Biased Precision for Measurement of Retrieval Effectiveness'. ACM Transactions on Information Systems 27, No. 1 (Dec. 2008): 1-27. 2008 https://doi.org/10.1145/1416950.1416952.

Morik, Marco, Ashudeep Singh, Jessica Hong, and Thorsten Joachims. 'Controlling Fairness and Bias in Dynamic Learning-to-Rank'. Proceedings of the 43rd International ACM SIGIR Conference on Research and Development in Information Retrieval, 429-38. Jul. 25, 2020 https://doi.org/10.1145/3397271.3401100.

Narasimhan, Harikrishna, Andrew Cotter, Maya Gupta, and Serena Wang. 'Pairwise Fairness for Ranking and Regression'. Proceedings of the AAAI Conference on Artificial Intelligence 34, No. 04 (Apr. 3, 2020): 5248-55. 2020 https://doi.org/10.1609/aaai.v34i04.5970.

Naszódi Márton and Alexandr Polyanskii. 2019. Perron and Frobenius meet Carathéodory. Published on arXiv as 1901.00540, Jan. 2019 https://arxiv.org/pdf/1901.00540.pdf.

Onn, Shmuel. 'Geometry, Complexity, and Combinatorics of Permutation Polytopes'. Journal of Combinatorial Theory, Series A 64, No. 1 (Sep. 1993): 31-49. 1993 https://doi.org/10.1016/0097-3165(93)90086-N.

Oosterhuis, Harrie. 'Computationally Efficient Optimization of Plackett-Luce Ranking Models for Relevance and Fairness'. In Proceedings of the 44th International ACM SIGIR Conference on Research and Development in Information Retrieval, 1023-32. Virtual Event Canada: ACM, 2021. https://doi.org/10.1145/3404835.3462830.

Ping, Wei, Kainan Peng, Andrew Gibiansky, Sercan O. Arik, Ajay Kannan, Sharan Narang, Jonathan Raiman, and John Miller. 'Deep Voice 3: Scaling Text-to-Speech with Convolutional Sequence Learning'. arXiv, Feb. 22, 2018. http://arxiv.org/abs/1710.07654.

Pitoura, Evaggelia, Kostas Stefanidis, and Georgia Koutrika. 'Fairness in Rankings and Recommendations: An Overview'. The VLDB Journal 31, No. 3: 431-58. 2021 https://link.springer.com/content/pdf/10.1007/s00778-021-00697-y.pdf.

Plackett R. L. 1975. The Analysis of Permutations. Journal of the Royal Statistical Society. Series C (Applied Statistics) 24, 2 (1975), 193-202. 1975 https://doi.org/10.2307/2346567.

Qin, Tao, and Tie-Yan Liu. 'Introducing LETOR 4.0 Datasets', CoRR abs/1306.2597 (2013). Published on arxiv as 13062597, 2013. https://arxiv.org/ftp/arxiv/papers/1306/1306.2597.pdf.

Rado R. 1952. An Inequality. Journal of the London Mathematical Society s1-27, 1, 1-6.1952 https://londmathsoc.onlinelibrary.wiley.com/doi/epdf/10.1112/jlms/s1-27.1.1.

(56) References Cited

OTHER PUBLICATIONS

Roberts Martin. The unreasonable efectiveness of quasirandom sequences, Apr. 2018. blog post http://extremelearning.com.au/unreasonable-effectiveness-of-quasirandom-sequences/.

Robertson, S.E. 'The Probability Ranking Principle in IR'. Journal of Documentation 33, No. 4 : 294-304. Apr. 1, 1977 https://doi.org/10.1108/eb026647.

Salimi, Babak, Luke Rodriguez, Bill Howe, and Dan Suciu. 'Interventional Fairness: Causal Database Repair for Algorithmic Fairness'. In Proceedings of the 2019 International Conference on Management of Data, 793-810. Amsterdam Netherlands: ACM, 2019. https://doi.org/10.1145/3299869.3319901.

Sano, Shinya, Naoto Miyoshi, and Ryohei Kataoka. 'M-Balanced Words: A Generalization of Balanced Words'. Theoretical Computer Science 314, No. 1-2 (Feb. 2004): 97-120. 2004 https://doi.org/10.1016/j.tcs.2003.11.021.

Schretter, Colas, Leif Kobbelt, and Paul-Olivier Dehaye. 'Golden Ratio Sequences for Low-Discrepancy Sampling'. Journal of Graphics Tools 16, No. 2: 95-104. Jun. 2012 https://doi.org/10.1080/2165347X.2012.679555.

Singh Ashudeep and Thorsten Joachims. Fairness of Exposure in Rankings. In Proceedings of the 24th ACM SIGKDD International Conference on Knowledge Discovery & Data Mining—KDD '18, pp. 2219{2228, London, United Kingdom, 2018. https://doi.org/10.1145/3219819.3220088.

Singh Ashudeep and Thorsten Joachims. Policy Learning for Fairness in Ranking. 33rd Conference NeurIPS 2019, Vancouver Canada, 2019 instead of In H. Wallach, H. Larochelle, A. Beygelzimer, F. dntextquotesingle Alch_e-Buc, E. Fox,and R. Garnett, editors, Advances in Neural Information Processing Systems 32, pp. 5427{5437. Curran Associates, Inc., 2019.

Singh, Ashudeep, David Kempe, and Thorsten Joachims. 'Fairness in Ranking under Uncertainty'. Published on arXiv as 10706720, Jul. 2021, https://arxiv.org/abs/2107.06720.

Su, Yi, Magd Bayoumi, and Thorsten Joachims. 'Optimizing Rankings for Recommendation in Matching Markets'. Published on arXiv as 210601941, Jun. 3, 2021. http://arxiv.org/abs/2106.01941.

Thonet, Thibaut, and Jean-Michel Renders. 'Multi-Grouping Robust Fair Ranking'. In Proceedings of the 43rd International ACM SIGIR Conference on Research and Development in Information Retrieval, 2077-80. Virtual Event China: ACM, 2020. https://doi.org/10.1145/3397271.3401292.

Trabucco Brandon. 2021. brandontrabucco/bvn. https://github.com/brandontrabucco/bvn original-date: Sep. 15, 2020T00:11:02Z.

Vuillon Laurent. Balanced words. Bulletin of the Belgian Mathematical Society—Simon Stevin 10, 5 (Dec. 2003), 787-805. 2003.

Waldspurger, Carl A, and William E Weihl. 'Stride Scheduling: Deterministic Proportional-Share Resource Management', Technical Report. Massachusetts Institute of Technology, USA. 1995.

Wang Lequn and Thorsten Joachims. Fairness and Diversity for Rankings in Two-Sided Markets. Published on arXiv as 201001470, Oct. 2020. https://arxiv.org/pdf/2010.01470v1.pdf.

Wang, Lequn, Yiwei Bai, Wen Sun, and Thorsten Joachims. 'Fairness of Exposure in Stochastic Bandits'. Published on arXiv as 210302735, Sep. 12, 2021. http://arxiv.org/abs/2103.02735.

Wang, Lequn, and Thorsten Joachims. 'User Fairness, Item Fairness, and Diversity for Rankings in Two-Sided Markets'. In Proceedings of the 2021 ACM SIGIR International Conference on Theory of Information Retrieval, 23-41, 2021. https://doi.org/10.1145/3471158.3472260.

Wang, Yuxuan, R. J. Skerry-Ryan, Daisy Stanton, Yonghui Wu, Ron J. Weiss, Navdeep Jaitly, Zongheng Yang, et al. 'Tacotron: Towards End-to-End Speech Synthesis'. arXiv, Apr. 6, 2017. http://arxiv.org/abs/1703.10135.

Wang, Yuxuan, Daisy Stanton, Yu Zhang, R. J. Skerry-Ryan, Eric Battenberg, Joel Shor, Ying Xiao, Fei Ren, Ye Jia, and Rif A. Saurous. 'Style Tokens: Unsupervised Style Modeling, Control and Transfer in End-to-End Speech Synthesis'. arXi, Mar. 23, 2018. http://arxiv.org/abs/1803.09017.

Williams Ronald J. Simple statistical gradient-following algorithms for connectionist reinforcement learning. Mach. Learn., 8:229{256, 1992.

Wu, Yao, Jian Cao, Guandong Xu, and Yudong Tan. 'TFROM: A Two-Sided Fairness-Aware Recommendation Model for Both Customers and Providers'. Published on arXiv as 210409024, Apr. 18, 2021. http://arxiv.org/abs/2104.09024.

Yadav Himank, Zhengxiao Du, and Thorsten Joachims. Fair Learning-to-Rank from Implicit Feedback. Published on arXiv as 191108054, Nov. 2019 https://arxiv.org/abs/1911.08054v1.

Yadav, Himank, Zhengxiao Du, and Thorsten Joachims. 'Policy-Gradient Training of Fair and Unbiased Ranking Functions'. In Proceedings of the 44th International ACM SIGIR Conference on Research and Development in Information Retrieval, 1044-53, 2021. https://doi.org/10.1145/3404835.3462953.

Yasutake, Shota, Kohei Hatano, Shuji Kijima, Eiji Takimoto, and Masayuki Takeda. 'Online Linear Optimization over Permutations'. In Algorithms and Computation, edited by Takao Asano, Shin-ichi Nakano, Yoshio Okamoto, and Osamu Watanabe, 7074:534-43. Lecture Notes in Computer Science. Berlin, Heidelberg: Springer Berlin Heidelberg, 2011. https://doi.org/10.1007/978-3-642-25591-5_55.

Zehlike, Meike, Francesco Bonchi, Carlos Castillo, Sara Hajian, Mohamed Megahed, and Ricardo Baeza-Yates. FA*IR: A Fair Top-k Ranking Algorithm'. In Proceedings of the 2017 ACM on Conference on Information and Knowledge Management, 1569-78. Singapore Singapore: ACM, 2017. https://doi.org/10.1145/3132847.3132938.

Zehlike Meike, Ke Yang, and Julia Stoyanovich. 2021. Fairness in Ranking: A Survey. Published on arXiv as 210314000, May 2021. http://arxiv.org/abs/2103.14000.

Zehlike Meike and Carlos Castillo. 2020. Reducing Disparate Exposure in Ranking: A Learning To Rank Approach. In Proceedings of The Web Conference 2020 (WWW '20). 2849-2855.2020 https://dl.acm.org/doi/10.1145/3366424.3380048.

European Search report for European Patent Application No. 21306565.9 dated Mar. 21, 2022.

Cvxopt/cvxopt. Retrieved on internet at https://github.com/cvxopt/cvxopt original-date: Feb. 22, 2013T22:14:31Z.

U.S. Appl. No. 18/084,239, filed Dec. 19, 2022, Till Kletti.

Alekh Agarwal, Miroslav Dudik, and Zhiwei Steven Wu. 2019. Fair Regression: Quantitative Definitions and Reduction-based Algorithms. arXiv: 1905.12843 [cs, stat] (May 2019). http://arxiv.org/abs/1905.12843 arXiv: 1905.12843.

Asia J. Biega, Fernando Diaz, Michael D. Ekstrand, and Sebastian Kohlmeier. 2019. Overview of the TREC 2019 Fair Ranking Track. In The Twenty-Eighth Text REtrieval Conference (TREC 2019) Proceedings.

Biega, Asia J., Krishna P. Gummadi, and Gerhard Weikum. "Equity of Attention: Amortizing Individual Fairness in Rankings." *ArXiv* 2018.

Chapelle, Olivier, Donald Metlzer, Ya Zhang, and Pierre Grinspan. "Expected Reciprocal Rank for Graded Relevance." In *Proceeding of the 18th ACM Conference on Information and Knowledge Management—CIKM '09*, 621. Hong Kong, China: ACM Press, 2009.

Chapelle, Olivier, and Ya Zhang. "A Dynamic Bayesian Network Click Model for Web Search Ranking." In Proceedings of the 18th International Conference on World Wide Web - WWW '09, 1. Madrid, Spain: ACM Press, 2009.

Chuklin, Aleksandr, Ilya Markov, and Maarten de Rijke. "Click Models for Web Search." *Synthesis Lectures on Information Concepts, Retrieval, and Services* 7, No. 3, 2015.

Diaz, Fernando, Bhaskar Mitra, Michael D. Ekstrand, Asia J. Biega, and Ben Carterette. "Evaluating Stochastic Rankings with Expected Exposure." In *Proceedings of the 29th ACM International Conference on Information & Knowledge Management*, 275-84. Virtual Event Ireland: ACM, 2020.

Cynthia Dwork, Moritz Hardt, Toniann Pitassi, Omer Reingold, and Richard Zemel. 2011. Fairness through awareness. In Proceedings of the 3rd Innovations in Theoretical Computer Science Conference on—ITCS '12. ACM Press, Cambridge, Massachusetts, 214-226. https://doi.org/10.1145/2090236.2090255.

(56) References Cited

OTHER PUBLICATIONS

Hong, Yili. "On Computing the Distribution Function for the Poisson Binomial Distribution." *Computational Statistics & Data Analysis*, 2013.

Morik, Marco, Ashudeep Singh, Jessica Hong, and Thorsten Joachims. "Controlling Fairness and Bias in Dynamic Learning-to-Rank." *arXiv*, 2020.

Mitra, Bhaskar, Nalisnick Eric, Craswell Nick, Caruana Rich. "A Dual Embedding Space Model for Document Ranking.Pdf," arXiv, 2016.

Naszódi, Márton, and Alexandr Polyanskii. "Perron and Frobenius Meet Carátheodory." *arXiv 2019*.

Niculescu-Mizil, Alexandru, and Rich Caruana. "Predicting Good Probabilities with Supervised Learning." In *Proceedings of the 22nd International Conference on Machine Learning*. Bonn, Germany: ACM Press, 2005.

Evaggelia Pitoura, Kostas Stefanidis, and Georgia Koutrika. 2021. Fairness in Rankings and Recommendations: An Overview. arXiv:2104.05994 [cs] (Apr. 2021). http://arxiv.org/abs/2104.05994 arXiv: 2104.05994.

Stephen Robertson. 1977. The Probability Ranking Principle in IR. Journal of Documentation 33 (Dec. 1977), 294-304. https://doi.org/10.1108/eb026647.

Walter Rudin. 1987. Real and complex analysis (3rd ed ed.). McGraw-Hill, New York.

Schretter, Colas, Leif Kobbelt, and Paul-Olivier Dehaye. "Golden Ratio Sequences for Low-Discrepancy Sampling." *Journal of Graphics Tools*, 2012.

Singh Ashudeep and Joachims Thorsten. "Fairness of Exposure in Rankings" In *Proceedings of the 24th ACM SIGKDD International Conference on Knowledge Discovery & Data Mining—KDD '18*. ACM Press, 2018.

Singh Ashudeep and Joachims Thorsten. "Policy Learning for Fairness in Ranking". *In Advances in Neural Information Processing Systems, 2019*.

Jones, K Sparck, S Walker, and S E Robertson. "A Probabilistic Model of Information Retrieval : Development and Comparative Experiments: Part 1," Information Processing & Management, 2000.

Tsakim. 2020. tsakim/poibin. https://github.com/tsakim/poibin original-date:May 2, 2016T08:40:41Z.

Waldspurger, Carl A, and William E Weihl. "Stride Scheduling: Deterministic Proportional-Share Resource Management," Technical Report MIT, 1995.

Zehlike, Meike, Francesco Bonchi, Carlos Castillo, Sara Hajian, Mohamed Megahed, and Ricardo Baeza-Yates. "FA*IR: A Fair Top-k Ranking Algorithm." In *Proceedings of the 2017 ACM on Conference on Information and Knowledge Management*. Singapore Singapore: ACM, 2017.

Meike Zehlike, Ke Yang, and Julia Stoyanovich. 2021. Fairness in Ranking: A Survey. arXiv:2103.14000 [cs] (May 2021). http://arxiv.org/abs/2103.14000 arXiv:2103.14000.

* cited by examiner

1: procedure project(INPUT: $S \subseteq S_n$)
2:     $P \subseteq S, |P| = n$    ▷ Conv($\mathbb{E}[\mathcal{E}(P)]$) is an initial facet
3:     $\hat{\mathcal{E}} \leftarrow \Pi_{\text{Conv}(\mathbb{E}[\mathcal{E}(P)])}(x^*)$    ▷ Project $x^*$ on Conv($\mathbb{E}[\mathcal{E}(P)]$)
4:     for $\pi \in S \setminus P$ do
5:       if $\left(\hat{\mathcal{E}} - \mathbb{E}[\mathcal{E}(\pi)]\right)^T Q(\lambda, \eta_1)(\hat{\mathcal{E}} - \mathbb{E}[x^*]) > 0$ then ▷
$\mathbb{E}[\mathcal{E}(\pi)]$ violates (6)
6:         $P \leftarrow P \cup \{\pi\}$ ▷ Append the improving permutation to $P$
7:         $\hat{\mathcal{E}}, \alpha_1, \ldots, \alpha_n \leftarrow \Pi_{\text{Conv}(\mathbb{E}[\mathcal{E}(P)])}(x^*)$    ▷ Project $x^*$ on Conv($\mathbb{E}[\mathcal{E}(P)]$) by solving a QP. $\hat{\mathcal{E}}$ is the projection, $\alpha_1, \ldots, \alpha_n$ are the convex coefficients.
8:         $P \leftarrow P \setminus \{\pi \in P | \mathcal{E}(\pi) \text{ has convex coef equal to } 0\}$ ▷ Reduce $P$ to cardinality $n$.
9:       end if
10:     end for
11: end procedure RETURN: $\hat{\mathcal{E}}, P, \alpha_1, \ldots, \alpha_n$

FIG. 8

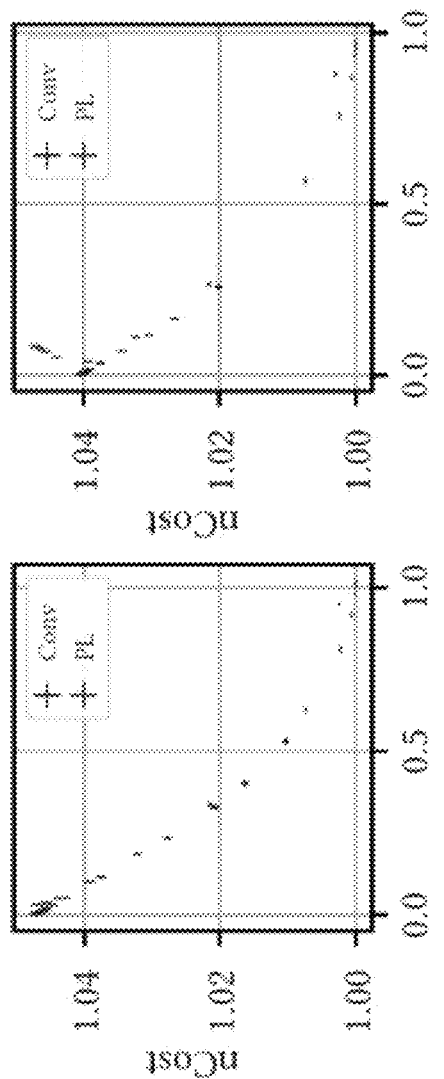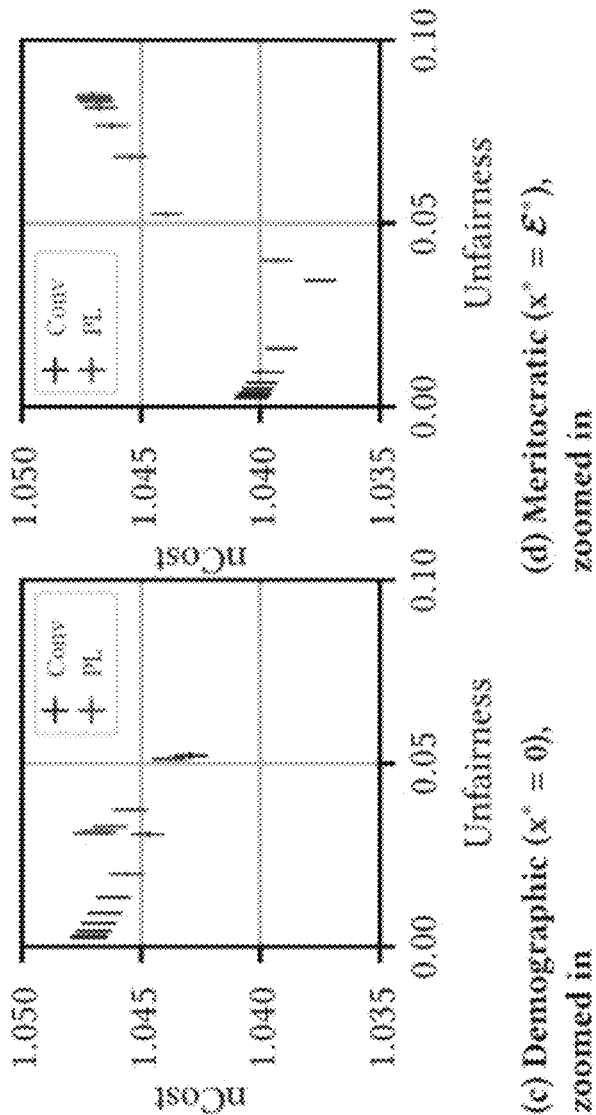
FIG. 9

FAIRNESS UTILITY TRADE-OFF IN RANKING AS A GEOMETRIC PROJECTION PROBLEM

FIELD

The present disclosure relates to systems and methods for providing ordered lists of results and, more particularly, to systems and methods that consider a tradeoff between fairness and utility of results.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Use of computers, smartphones, and other Internet-connected devices has grown exponentially. Users utilize Internet-connected devices for many different tasks. For example, a user may utilize an Internet-connected device to search for local businesses, such as restaurants. As another example, a user may utilize an Internet-connected device to obtain directions to navigate to a desired location. As yet another example, a user may utilize an Internet-connected device to perform one or more building related functions, such as turn on a light within a building, adjust heating or cooling of a building, or open or close a garage door. As yet another example, a user may utilize an Internet-connected device to search for information on a topic, place an order, answer a question, etc.

Automatic ranking systems play a role in life, such as in the providing of results to searches, providing relevant job listings, songs, books, etc., and in other places. Automatic ranking systems connect producers of items with consumers of items by determining which items the consumers are exposed to and which items consumers are not exposed to. While it is desirable to give as much visibility to items that are more relevant to consumers, it is important to ensure that producers are not unjustly disadvantaged in terms of exposure. Utility (consumer utility) may refer to relevance to consumers, while fairness (producer fairness) may refer to fairness to producers of items.

Highly ranked items may be more visible (e.g., provided earlier) to consumers than lower ranked items. Highly ranked items are therefore more likely to be selected than lower ranked items. This may be referred to position bias. Ordering items by decreasing relevance may provide good consumer utility, but may provide less fairness to items and producers having similar utilities. This may be referred to as meritocratic fairness. Demographic fairness may involve attempting to provide the same exposure to every item, regardless of the items' relevance. While being more fair to producers, demographic fairness may provide consumers with less relevant items.

SUMMARY

In a feature, a ranking system includes: an exposure module configured to, in response to receiving an input from a computing device via a network, determine, based on an anisotropic intensity value and using a Dynamic Bayesian Network (DBN) exposure model, an exposure value for ranking items for output via the computing device, where the anisotropic intensity value corresponds to a tradeoff between utility to users and fairness to item producers; a ranking module configured to generate a ranking of the items based on the exposure value; and a response module configured to transmit a response including the ranking of the items to the computing device via the network.

In further features, an administrator module is configured to set the anisotropic intensity value based on user input.

In further features, the ranking module is configured to generate the ranking of the items further based on relevance values for the items, respectively.

In further features, the relevance values are unknown.

In further features, the relevance values are known and stored in memory.

In further features, the ranking module is configured to generate the ranking further based on a frequency of the input.

In further features, the computing device is configured to at least one of: display the items on a display in order according to the ranking; and output the items via a speaker in order according to the ranking.

In further features, the exposure module is configured to determine an ellipse based on the anisotropic intensity value and determine the exposure value using the ellipse.

In further features, the exposure module is configured to determine a shape of the ellipse based on the anisotropic intensity value.

In further features, the exposure module is configured to determine the exposure value further based on a target exposure vector.

In further features, the target exposure vector includes exposures for the items, respectively, when averaged over all probability ranking principle (PRP) rankings.

In further features, the fairness to item producers is at least one of meritocratic fairness and demographic fairness.

In a feature, a ranking method includes: in response to receiving an input from a computing device via a network, determining, based on an anisotropic intensity value and using a Dynamic Bayesian Network (DBN) exposure model, an exposure value for ranking items for output via the computing device, where the anisotropic intensity value corresponds to a tradeoff between utility to users and fairness to item producers; generating a ranking of the items based on the exposure value; and transmitting a response including the ranking of the items to the computing device via the network.

In further features, the ranking method further includes setting the anisotropic intensity value based on user input.

In further features, generating the ranking includes generating the ranking of the items further based on relevance values for the items, respectively.

In further features, the relevance values are unknown.

In further features, the relevance values are known and stored in memory.

In further features, generating the ranking includes generating the ranking further based on a frequency of the input.

In further features, the ranking method further includes, by the computing device, at least one of: display the items on a display in order according to the ranking; and output the items via a speaker in order according to the ranking.

In further features, the ranking method further includes: determining an ellipse based on the anisotropic intensity value; and determining the exposure value using the ellipse.

In further features, the ranking method further includes determining a shape of the ellipse based on the anisotropic intensity value.

In further features, the ranking method further includes determining the exposure value further based on a target exposure vector.

In further features, the target exposure vector includes exposures for the items, respectively, when averaged over all probability ranking principle (PRP) rankings.

In further features, the fairness to item producers is at least one of meritocratic fairness and demographic fairness.

In a feature, a ranking system includes: a means (e.g., one or more processors and code as discussed below) for, in response to receiving an input from a computing device via a network, determining, based on an anisotropic intensity value and using a Dynamic Bayesian Network (DBN) exposure model, an exposure value for ranking items for output via the computing device, where the anisotropic intensity value corresponds to a tradeoff between utility to users and fairness to item producers; a means for (e.g., one or more processors and code as discussed below) generating a ranking of the items based on the exposure value; and a means for (e.g., one or more processors and code as discussed below) transmitting a response including the ranking of the items to the computing device via the network.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 8 includes an example algorithm that can be used to determine an exposure value;

FIG. 9 illustrates how the systems and methods described herein perform in comparison to a Plackett-Luce (PL) policy.

In the drawings, reference numbers may be reused to identify similar and/or identical elements.

DETAILED DESCRIPTION

When delivering a ranked list of results in response to a search query, the search system may naturally give more exposure to highly ranked results than to lower ranked results. For example, results may be ordered by decreasing relevance with respect to a query. This, however, may be unfair to producers (e.g., of items that can be provided as results). For example, with many results almost equally relevant, items with similar relevance are given different amounts of exposure. Amortization can be used to help deal with the above referenced unfairness. Amortization involves delivering different rankings in order to adjust utility and fairness to target values.

The present application involves a system that computes a distribution regarding results offline for a Dynamic Bayesian Network (DBN) exposure model. The system finds a Pareto-optimal distribution for a utility objective and a fairness objective using at most as many rankings as there are items to rank. The exposure model takes into account relevance values that could be used to order items in descending order of relevance.

While the following will be discussed in the context of providing search results in response to a query, the present application is also applicable to providing results and an order for providing the results, such as recommendation systems that recommend items (e.g., songs, documents, etc.) and other types of systems.

Figure 1:
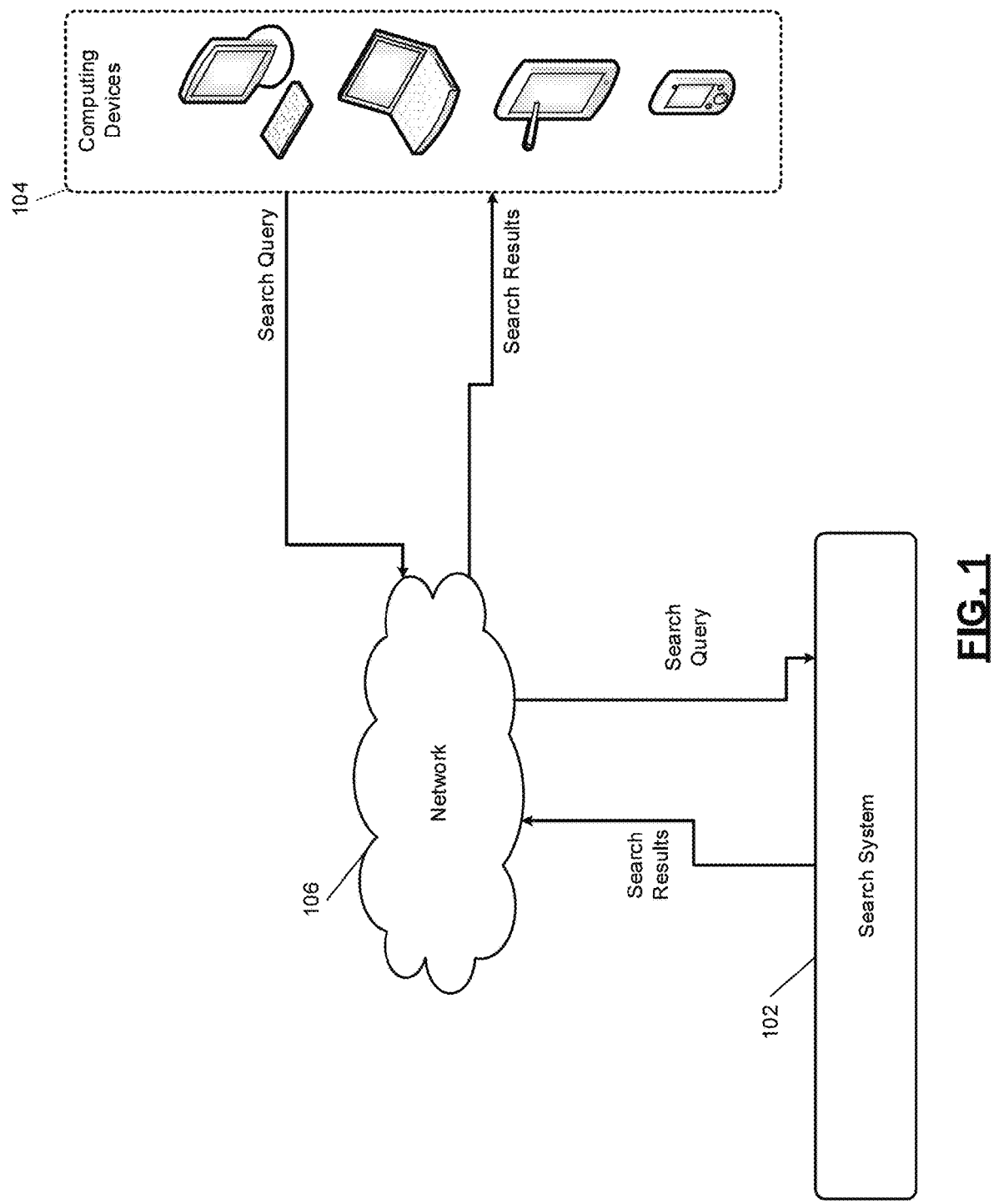
FIG. 1 includes a functional block diagram of an example environment including a search system configured to provide search results in response to queries.

FIG. 1 includes a functional block diagram including a search system 102 configured to respond to queries. The search system 102 is configured to receive queries from one or more user computing device(s) 104 via a network 106. The queries may be, for example, text input to a computing device, audio input to a computing device, or input received in one or more other manners.

The search system 102 performs searches based on the queries, respectively, to identify one or more search results. The search system 102 transmits the results back to the computing devices 104 that transmitted the queries, respectively. For example, the search system 102 may receive queries regarding a subject, such as a business, a point of interest, a product, etc. The search system 102 may provide results indicative of information regarding subjects to the computing devices 104.

The computing devices 104 output the results to users. For example, the computing devices 104 may display the results to users on one or more displays of the computing devices and/or one or more displays connected to the computing devices. Additionally or alternatively, the computing devices 104 may audibly output the results via one or more speakers. The computing devices 104 may also output other information to the users. For example, the computing devices 104 may output additional information related to the results, advertisements related to the results, and/or other information. The search system 102 and the computing devices 104 communicate via a network 106.

A plurality of different types of computing devices 104 are illustrated in FIG. 1. An individual user computing device may also be referred to herein as a computing device 104. The computing devices 104 include any type of computing devices that is configured to generate and transmit queries to the search system 102 via the network 106. Examples of the computing devices 104 include, but are not limited to, smart (cellular) phones, tablet computers, laptop computers, and desktop computers, as illustrated in FIG. 1. The computing devices 104 may also include other computing devices having other form factors, such as computing devices included in vehicles, gaming devices, televisions, consoles (e.g., smart speakers without displays Amazon Echo, Google Home, Clova Friends mini) or other appliances (e.g., networked refrigerators, networked thermostats, etc.).

The computing devices 104 may use a variety of different operating systems. In an example where a computing device 104 is a mobile device, the computing device 104 may run an operating system including, but not limited to, Android, iOS developed by Apple Inc., or Windows Phone developed by Microsoft Corporation. In an example where a computing device 104 is a laptop or desktop device, the computing device 104 may run an operating system including, but not limited to, Microsoft Windows, Mac OS, or Linux. The computing devices 104 may also access the search system 102 while running operating systems other than those operating systems described above, whether presently available or developed in the future.

In some examples, a computing device 104 may communicate with the search system 102 using an application installed on the computing device 104. In general, a computing device 104 may communicate with the search system 102 using any application that can transmit queries to the search system 102 to be responded to (with results) by the search system 102. In some examples, a computing device 104 may run an application that is dedicated to interfacing with the search system 102, such as an application dedicated to performing searching and providing search results. In some examples, a computing device 104 may communicate with the search system 102 using a more general application, such as a web-browser application. The application executed by a computing device 104 to communicate with the search system 102 may display a search field on a graphical user interface (GUI) in which the user may input queries. The user may input a query, for example, by adding text to a text field using a touchscreen or physical keyboard, a speech-to-text program, or other form of user input.

A text query entered into a GUI on a computing device 104 may include words, numbers, letters, punctuation marks, and/or symbols. In general, a query may be a request for information identification and retrieval from the search system 102. For example, a query including text may be directed to providing information regarding a subject (e.g., a business, point of interest, product, etc.) of the text of the query.

A computing device 104 may receive results from the search system 102 that is responsive to the search query transmitted to the search system 102. In various implementations, the computing device 104 may receive and the search system 102 may transmit multiple results that are responsive to the search query or multiple items (e.g., entities) identified in a query. In the example of the search system 102 providing multiple results, the search system 102 may determine a confidence value for each of the results and provide the confidence values along with the results to the computing device 104. The computing device 104 may display more than one of the multiple results (e.g., all results having a confidence value that is greater than a predetermined value), only the result with the highest confidence value, the results having the N highest confidence values (where N is an integer greater than one), etc. As discussed further below, the search system 102 generates the confidence values to provide a tradeoff between utility and fairness.

The computing device 104 may be running an application including a GUI that displays the result(s) received from the search system 102. The respective confidence value(s) may also be displayed, or the results may be displayed in order (e.g., descending) based on the confidence values. For example, the application used to transmit the query to the search system 102 may also present (e.g., display or speak) the received search results(s) to the user via the computing device 104. As described above, the application that presents the received result(s) to the user may be dedicated to interfacing with the search system 102 in some examples. In other examples, the application may be a more general application, such as a web-browser application.

The GUI of the application running on the computing device 104 may display the search result(s) to the user in a variety of different ways, depending on what information is transmitted to the computing device 104. In examples where the results include a list of results and associated confidence values, the search system 102 may transmit the list of results and respective confidence values to the computing device 104. In this example, the GUI may display the result(s) and the confidence value(s) to the user as a list of possible results.

In some examples, the search system 102, or another computing system, may transmit additional information to the computing device 104 such as, but not limited to, applications and/or other information associated with the results, the query, points of interest associated with the results, etc. This additional information may be stored in a data store and transmitted by the search system 102 to the computing device 104 in some examples. In examples where the computing device 104 receives the additional information, the GUI may display the additional information along with the result(s). In some examples, the GUI may display the results as a list ordered from the top of the screen to the bottom of the screen by descending confidence value. In some examples, the results may be displayed under the search field in which the user entered the query.

In some examples, the computing devices 104 may communicate with the search system 102 via another computing system. The other computing system may include a computing system of a third party using the search functionality of the search system 102. The other computing system may belong to a company or organization other than that which operates the search system 102. Example parties which may leverage the functionality of the search system 102 may include, but are not limited to, internet search providers and wireless communications service providers. The computing devices 104 may send queries to the search system 102 via the other computing system. The computing devices 104 may also receive results from the search system 102 via the other computing system. The other computing system may provide a user interface to the computing devices 104 in some examples and/or modify the user experience provided on the computing devices 104.

The computing devices 104 and the search system 102 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

Figure 2:
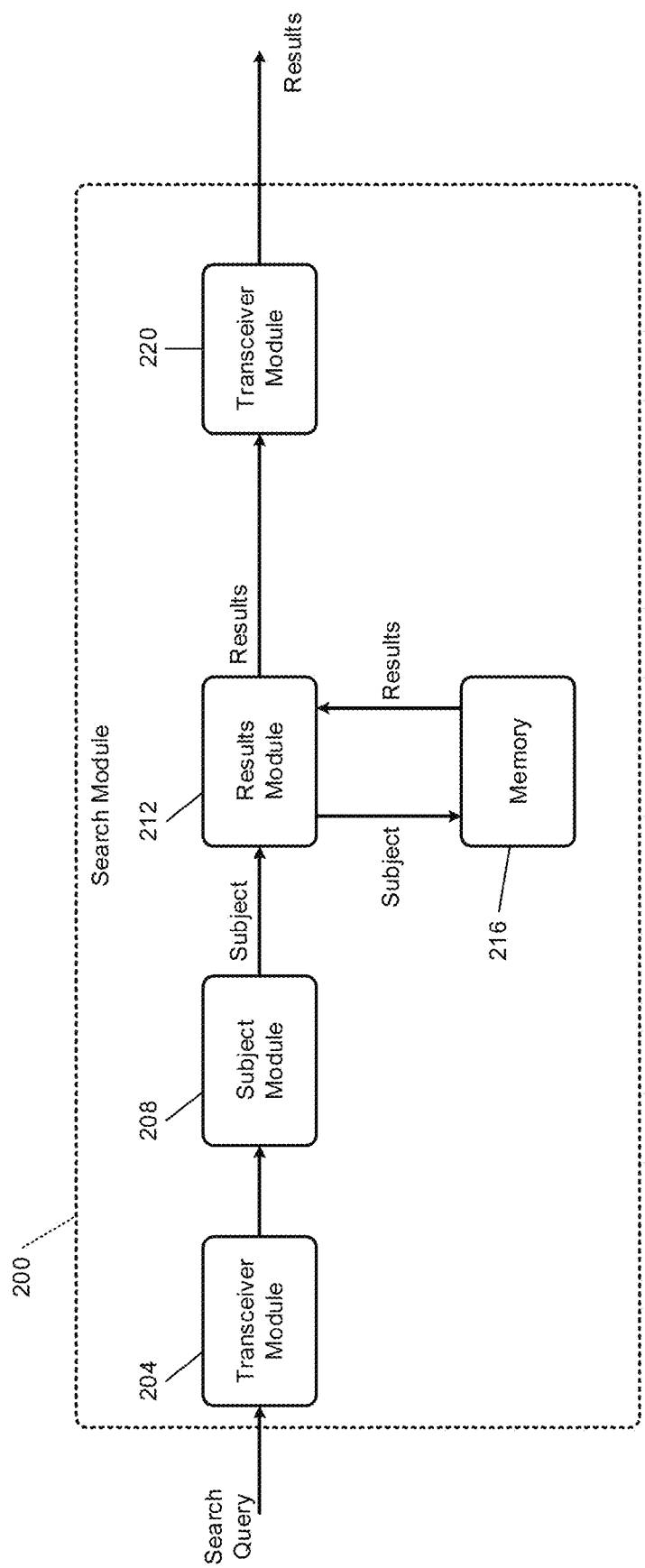
FIG. 2 is a functional block diagram including an example implementation of a search module of the search system.

FIG. 2 is a functional block diagram including an example implementation of a search module 200 of the search system 102. A first transceiver module 204 receives a query from a computing device 104. A subject module 208 parses the query and may determine a subject of the query. As an example, the subject may be a business, a product, a point of interest, etc.

A results module 212 determines results regarding the query, such as from memory 216. The results module 212 also determines the confidence values for the results, respectively. A second transceiver module 220 transmits the determined results for the query back to the computing device 104 via the network 106. In various implementations, the second transceiver module 220 may be omitted, and the first transceiver module 204 may transmit the results back to the computing device 104 from which the query was received. As discussed further below, the results module 212 determines the confidence values to provide a tradeoff between (a) utility to consumers of information and (b) fairness to producers of information.

Figure 3:
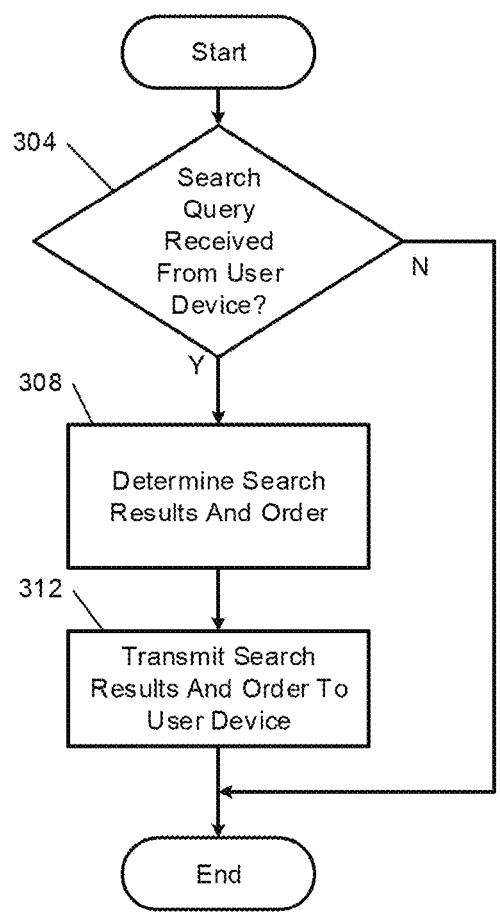
FIG. 3 includes a flowchart depicting an example method of receiving a query regarding a subject and providing search results and an order.

FIG. 3 includes a flowchart depicting an example method of receiving a query and providing results in response to the query. The example of FIG. 3 may be performed by the search module 200. Control begins with 304 where the search module 200 receives a query from a computing device 104.

At 308, the results module 212 determines search results and an order (e.g., confidence values). The results module 212 may also retrieve other information associated with the query. At 312, the search module 200 transmits the search results and the confidence values to the computing device 104 from which the query was received. The computing device 104 outputs the received search results, such as visually via a display and/or audibly via a speaker. While the example of FIG. 3 is illustrated as ending, control may return to 304. Multiple instances of the example of FIG. 3 may be performed simultaneously.

Figure 4:
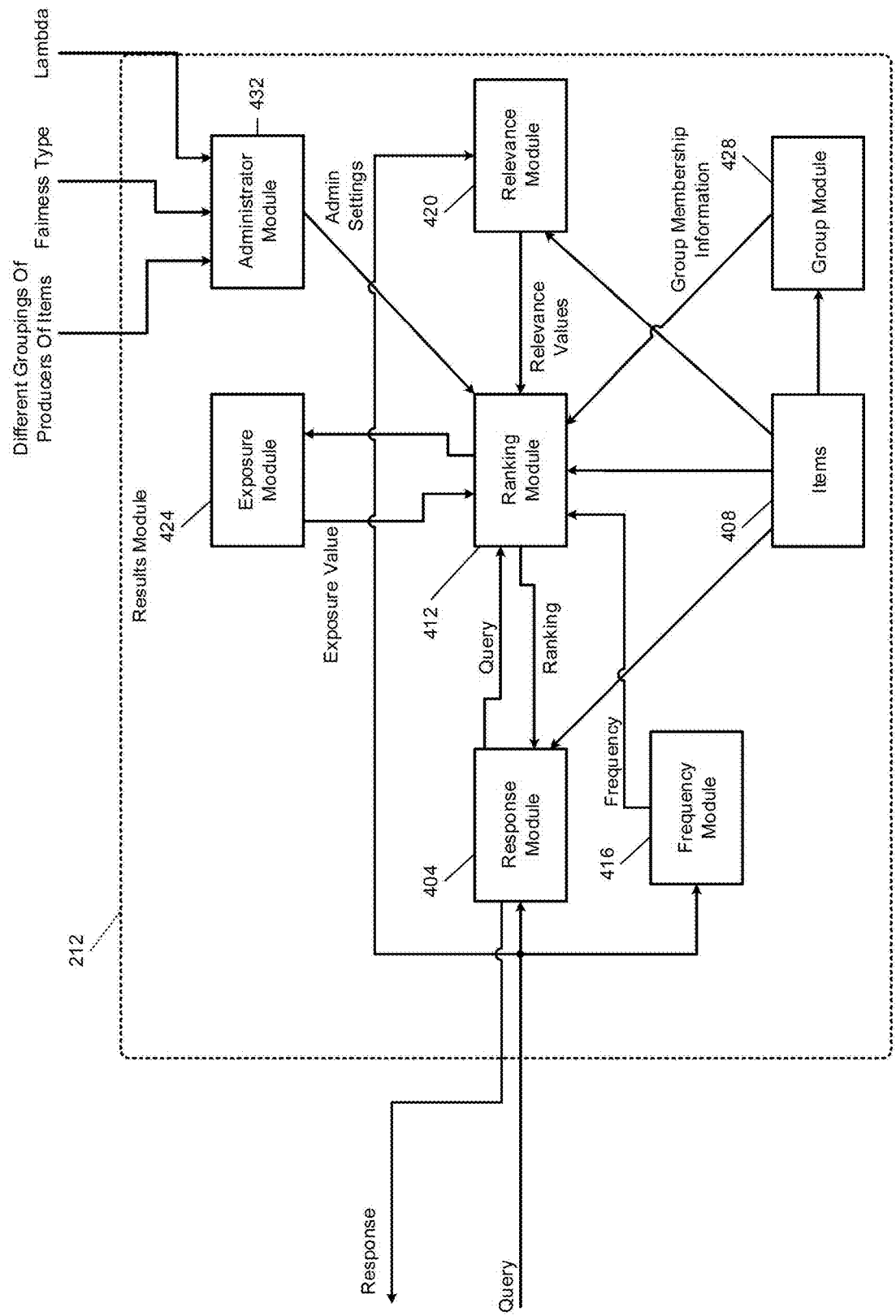
FIG. 4 is a functional block diagram of an example of a results module.

FIG. 4 is a functional block diagram of an example of the results module 212. A response module 404 receives a query and determines a response to the query. The response includes a ranked list of entities 408 associated with the query to be output via a computing device that transmitted the query. The entities 408 may be webpages, songs, or another form of consumable item that is available via the Internet.

A ranking module 412 sets the rankings of the entities in the ranked list based on a frequency of the query (e.g., a subject of the query), relevance values for the entities 408, respectively, and an exposure value. A frequency module 416 receives each query and determines frequencies of queries. The frequency of a query may indicate how frequently queries for a subject are received from all computing devices generally. The frequency module 416 may determine the frequencies of queries, for example, using counters. A relevance module 420 provides the relevance (utility) values of the entities 408, respectively, for the query.

An exposure module 424 determines the exposure value for the query based on the relevance values and one or more other parameters, as discussed further below. The exposure module 424 sets the exposure value to provide a tradeoff between utility of the entities 408 and fairness to producers of the entities 408. The exposure value may refer to a point on a surface of a model that provides a desired balance between fairness and utility of entities. Based on the exposure value, the ranking module 412 determines the ranking for the query. The exposure module 424 varies the exposure value over time even for the same query received from different computing devices such that different ranked lists of the items are provided to different computing devices. For example, the ranking module 412 may determine the ranking using one or more models that relate relevance values, query frequencies, and exposure values to ranking (lists).

In various implementations, a group module 428 may provide group membership information, such as gender, hair color, preference, and/or other user attributes. The ranking module 428 may determine the ranking for the query further based on the group membership information.

An administrator module 432 provides administrator settings. The ranking module 428 may determine the ranking for the query based on one or more of the administrator settings. For example, the administrator settings may include, for example, groupings (e.g., by subject) of the items 408, a fairness type to use to generate the ranking, and a lambda value.

Consider the following scenario: given a query q associated to a set of n items (e.g., documents). Ranked lists of these n items are returned sequentially in response to different queries in a manner that is useful to the recipients of the rankings and fair to the producers of the items after a large number of delivered rankings. Queries are repeated and amortization is done on each query independently. In other words, ranking for responding to a second query q2 are not set to compensate for unfairness in rankings used to respond to a first query q1. The true relevance values of these n items with respect to the query q are binary and may be unknown. Provided are probabilities for each item that are relevant in response to a query. Users (of computer devices transmitting the queries) may assumed to be the same and anonymous to increase fairness at the user/consumer side.

Herein, $\bullet^T$ may denote the transpose operator and $\|\bullet\|_2^2$ may denote the square isotropic 2-norm. $\|\bullet\|_1$ may denote the 1-norm. The bar $\bar{\bullet}$ may be used to denote the average value of the components of a vector e.g., $\bar{x}$. lcm($\bullet$, $\bullet$) may be used to denote the least common multiple of two integers. The expectation of a random variable may be denoted by $\mathbb{E}[\bullet]$ and the variance may be denoted by $\mathbb{V}[\bullet]$. The convex hull may be denoted by Conv($\bullet$). The terms document and item may be used interchangeably.

Rankings may be expressed as permutations. A permutation or ranking $\pi$ of size n may be a bijection on $\{1, \ldots, n\}$. $S_n$ may be the set of all permutations size n. $\pi$ may be a function that maps a rank k to an item $\pi(k)$ and not the item to its rank. A subset of rankings may be defined that satisfy the Probability Ranking Principle (PRP). Regarding such a subset, given a vector of relevance probabilities $\rho \in [0,1]^n$, the subset $PRP(\rho) \subseteq S_n$ of PRP rankings may be the set of $\pi \in S_n$ such that $\rho_{\pi(1)} \geq \ldots \geq \rho_{\pi(n)}$.

The exposure of an item may be considered to be the probability of the user examining the item, which may also be referred to as attention probability or examination probability. The exposure module 424 uses a Dynamic Bayesian Network (DBN) exposure model, defined as follows.

Dynamic Bayesian Network (DBN) Exposure Model

Consider a query in response to which a ranking of n items with binary relevances $r=(r_i)_{i \in \{1, \ldots, n\}} \in \{0,1\}^n$ is to be determined by the ranking module 412. Suppose that the ranking module 412 responds with a ranking $\pi$. The DBN exposure by the exposure module 424 may be defined by $\varepsilon_i(\pi, r)$ of an item i at rank $k=\pi^{-1}(i)$ as $$\varepsilon_i(\pi, r) = \gamma^{k-1}\prod_{l=1}^{k-1}(1 - \kappa r_{\pi(l)})$$

where $\gamma \in (0,1)$ is the probability of non-abandonment, and $\kappa \in (0,1)$ is the probability of (a user) stopping the search at a relevant item. $\varepsilon(\pi, r)=(\varepsilon_i(\pi, r))_{i \in \{1,\ldots,n\}}$ may be the vector of item exposures in $\mathbb{R}_+^n$. The elements of this vector may not be ordered from highest to lowest, and each dimension corresponds to an item and not to a rank. Table 1 below illustrates an example of the exposures obtained with a DBN model and with a PRP ranking.

TABLE 1

Example of a PRP ranking.

| Rank | 1 | 2 | 3 | 4 | 5 |
|---|---|---|---|---|---|
| Relevance | 1 | 1 | 0 | 0 | 0 |
| Exposure | 1 | $\gamma(1-\kappa)$ | $\gamma^2(1-\kappa)^2$ | $\gamma^3(1-\kappa)^2$ | $\gamma^4(1-\kappa)^2$ |

The DBN exposure model is quite general and encompasses other models such as the Cascade Model (CM) or the Simplified Dynamic Bayesian Network (SDBN).

At the producer side, exposure can also be interpreted as the value documents get from a ranking. The value that a consumer obtains from a ranking may be defined as follows. Given an exposure model, which to a ranking $\pi$ and a relevance vector r associates an exposure vector $\varepsilon(\pi, r)$, the utility of a ranking $\pi$ may be defined as $$U(\pi,r)=\varepsilon(\pi,r)^T r.$$

This is the scalar product of the exposure vector with the vector of relevances. The utility of a ranking may be interpreted as the total exposure given to relevant items. Notice that given a ranking $\pi$, the utility may not be defined as a linear function of the relevance vector, because the exposure vector depends on r in a non-linear way.

Known Relevance Values

Theorem 1 below illustrates that there may be an affine relationship between the total exposure and the utility of a ranking, with a negative slope. Consider a DBN exposure with model parameters $\kappa \in (0,1)$, $\gamma \in (0,1)$. The utility $U(\pi,r)$ and the exposure vector $\varepsilon(\pi, r)$ satisfy for any ranking $\pi \in S_n$ $$\|\varepsilon(\pi, r)\|_1 = \frac{1-\gamma^n(1-\kappa)^{n_r}}{1-\gamma} - \frac{\gamma \kappa}{1-\gamma}U(\pi, r) \quad (1)$$

where $n_r = \sum_{i+1}^n r_i$ is the number of relevant items. Theorem 1 may mean that the more exposure the items get, the less useful the ranking is. Intuitively this can be understood by noticing that the total exposure can be increased by putting non-relevant items at top position, which decreases utility. Theorem 1 also has an important consequence that will be quite useful in that concerns the geometry of the convex hull of all achievable exposure vectors, denoted as $$\Pi(r):=\mathrm{Conv}(\{\varepsilon(\pi,r)|\pi \in S_n\})$$

Figure 5:
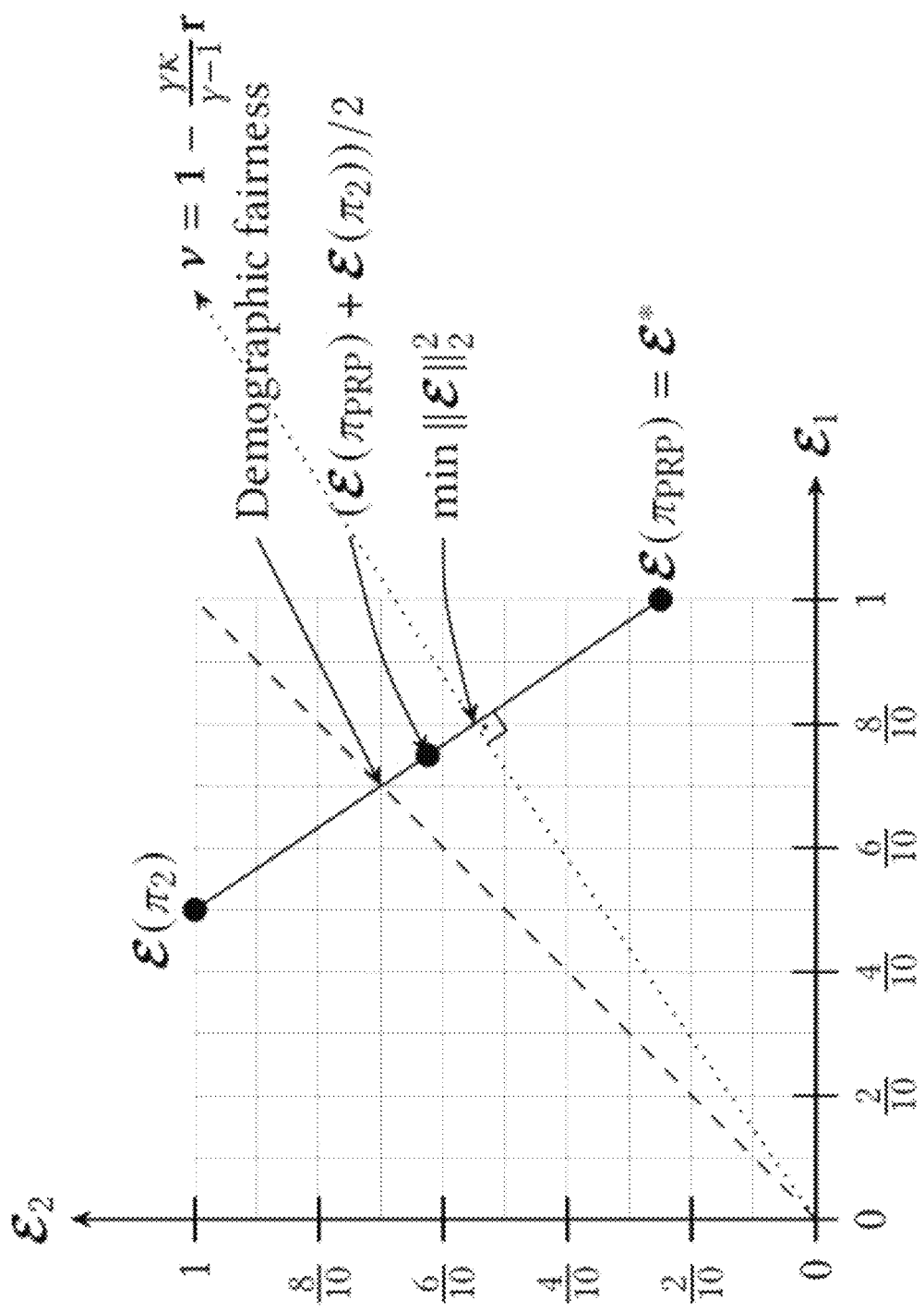
FIG. 5 includes an example graph of a norm.

The polytope $\Pi(r)$ is contained in a hyperplane with normal vector $$v = 1 + \frac{\gamma \kappa}{1-\gamma}r$$

where 1 denotes the vector whose all components are equal to 1. The normal vector v is illustrated in FIG. 5 for 2 items. The X axis illustrates exposure of item 1, while the Y axis illustrates exposure of item 2. The normal vector v is not collinear to the vector $1=(1, 1, \ldots, 1)$ which distinguishes the DBN exposure model from the PBM. In FIG. 5, the point (7/10, 7/10) achieves demographic fairness, but does not minimize $\|\varepsilon\|_2^2$. The point (8/10, 11/20) minimizes $\|\varepsilon\|_2^2$, but does not achieve demographic fairness. The point (3/4, 5/8) obtained by sampling uniformly over all rankings achieves neither equity nor minimal $\|\varepsilon\|_2^2$. The point $\varepsilon(\pi_{PRP})=(1,1/4)$ is the exposure obtained with PRP ranking, achieving maximum utility. The point $\varepsilon(\pi_2)=(1/2, 1)$ is the exposure obtained with PRP ranking in reverse order. The line segment joining the two points represents exposures achievable using distributions over permutations.

Figure 6:
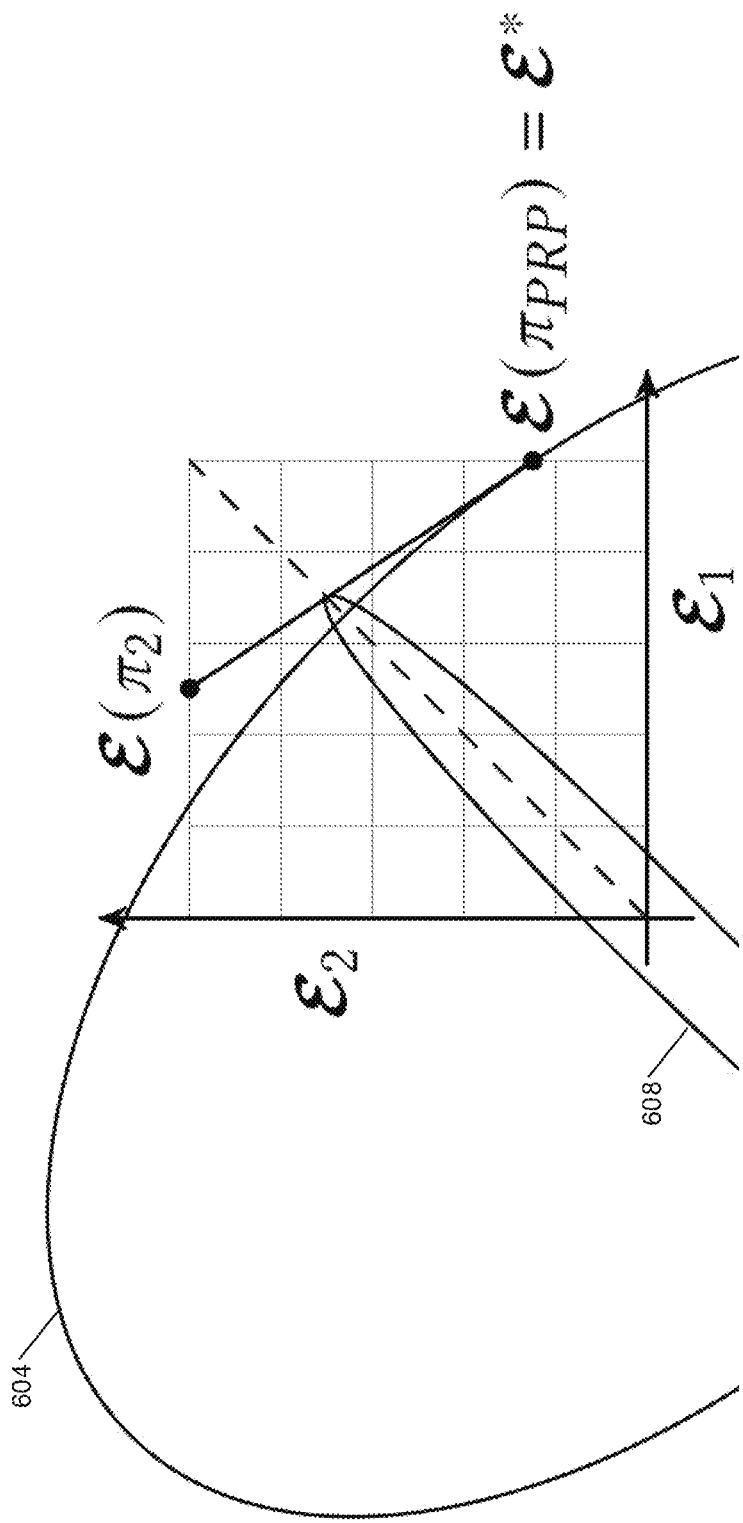
FIG. 6 illustrates an example use of an anisotropic norm.

FIG. 6 illustrates use of an anisotropic norm with adequate direction. Minimal HEM can achieve minimal demographic unfairness or maximum utility, depending on the anisotropy intensity $\lambda$ (lambda). The ellipses represent level curves of $\|\varepsilon\|_q^2$ for 2 different anisotropic intensities. Namely, ellipse 604 corresponds to $\lambda$ closer to 1 and provides greater utility with lesser fairness. Ellipse 608 corresponds to $\lambda$ closer to 0, which provides greater fairness with lesser utility.

Consider the problem of designing a ranking policy (used by the ranking module 412 to determine the ranking for a query) that will control the exposure to reach some target vector. Formally, the ranking module 412 may be trained to achieve a distribution P over rankings such that the corresponding expected exposure E taken over the rankings $$\varepsilon = \Sigma_{\pi \in S_n} \mathbb{P}(\pi)\varepsilon(\pi,r)$$

is as close as possible to a predetermined target and with a predetermined metric.

All exposure vectors live in a hyperplane contained in $\mathbb{R}^n$, meaning that the polytope of all exposure vectors has an intrinsic dimension equal to (n−1). Consequently, Carathéodory's theorem dictates that the solution can be expressed as a convex combination of at most n exposure vectors obtained with n different rankings $\pi_1, \ldots, \pi_n$ with coefficients $P(\pi_i)$. Once such a convex combination is found, the corresponding policy can be deployed by a scheduling algorithm, such as the Stride Scheduling or the Golden Ratio Sequences scheduling algorithm. The Stride Scheduling algorithm is described in C. A. Waldspurger and E. Weihl. W. 1995. Stride Scheduling: Deterministic Proportional-Share Resource Management. Technical Report. Massachusetts Institute of Technology, USA, which is incorporated herein in its entirety. The Golden Ratio Sequences scheduling algorithm is described in Colas Schretter, Leif Kobbelt, and Paul-Olivier Dehaye, Golden Ratio Sequences for Low-Discrepancy Sampling. Journal of Graphics Tools 16, 2 (June 2012), 95-104, https://doi.org/10.1080/2165347X.2012.679555, which is incorporated herein in its entirety. This may be better than sampling from the distribution, because the actual proportions with which the rankings are delivered are kept close to the target proportions in a controlled manner.

Target exposure $\varepsilon^*$ can be defined as described in Fernando Diaz, Bhaskar Mitra, Michael D. Ekstrand, Asia J. Biega, and Ben Carterette, 2020, Evaluating Stochastic Rankings with Expected Exposure, In Proceedings of the 29th ACM International Conference on Information & Knowledge Management (CIKM '20), Association for Computing Machinery, New York, NY, USA, 275-284. https://doi.org/10.1145/3340531.3411962, which is incorporated in its entirety. The target exposure is the exposure that an item gets when averaged over all PRP rankings. This can be written as $$\varepsilon^*(r) = \frac{1}{|PRP(r)|} \sum_{\pi \in PRP(r)} \varepsilon(\pi, r) \quad (2)$$

Equivalently, given a PRP ranking, the target exposure of a relevant item is the average exposure of all relevant items, and the target exposure of an irrelevant item is the average exposure of all irrelevant items. In various implementations, $0 \in \mathbb{R}^n$ can be chosen as a target vector, where 0 denotes the vector whose components are all equal to 0. As we will see, these two choices will lead to either or both of meritocratic fairness or demographic fairness.

The exposure module 424 may minimize $$\underbrace{\lambda \|\varepsilon\|_2^2}_{EE-D} - \underbrace{(1-\lambda)\varepsilon^T \varepsilon^*}_{EE-R}$$

where $\lambda$ is a trade-off parameter, EE-D is a measure of inequity in the distribution of exposure, and EE-R is a measure of how much of the exposure is on relevant items. FIG. 5 illustrates that this may be incorrect for EE-D, when a DBN exposure model is used. The point minimizing $\|\varepsilon\|_2^2$ does not correspond to equity, which may be referred to as demographic fairness, i.e., to choose the point where every item receives the same exposure.

The present application (the exposure module 424) determines the exposure value using an anisotropic norm $\|\varepsilon\|_Q^2$ instead of $\|\varepsilon\|_2^2$. FIG. 6 illustrates how controlling the anisotropy of the norm can make it possible to trade off utility and fairness. The anisotropic norm is made more precise and accurate by introducing a parametric anisotropy matrix $Q(\lambda, \eta_1)$ as follows.

Given an anisotropy intensity (lambda) $\lambda \in [0,1]$ and an anisotropy direction $\eta_1 \in \mathbb{R}^n$, $\|\eta_1\|_2 = 1$, consider the orthonormal basis of $\mathbb{R}^n$ including the vectors $\eta_1$ and n−1 arbitrary other vectors $\eta_2, \ldots, \eta_n$ such that they form an orthonormal basis with $\eta_1$. In this basis, consider the matrix $$M_\lambda = 2 \begin{pmatrix} \lambda & 0 & \cdots & 0 \\ 0 & 1-\lambda & \ddots & \vdots \\ \vdots & \ddots & \ddots & 0 \\ 0 & \cdots & 0 & 1-\lambda \end{pmatrix}.$$

In the standard basis the, matrix can be written $Q(\lambda, \eta_1) = P(\eta_1)^T M_\lambda P(\eta_1)$, where $P(\eta_1)$ is a change of basis matrix. When $\lambda = \frac{1}{2}$, the identity matrix is recovered.

A utility-fairness (UF) metric can be defined as $$UF(\varepsilon) = \|\varepsilon - x^*\|_{Q(\lambda, \eta_1)} = \sqrt{(\varepsilon - x^*)^T Q(\lambda, \eta_1)(\varepsilon - x^*)},$$

where $x^\square$ (0 or $\varepsilon^*$) is a target vector in $\mathbb{R}^n$. The norm is taken with the anisotropy matrix $Q(\lambda, \eta_1)$. It can be checked using the basis $(\eta_i)_{i \in \{1, \ldots, n\}}$ that a $$UF(\varepsilon) = \sqrt{2\lambda \|C\|_2^2 + 2(1-\lambda)\|F\|_2^2}, \quad (3)$$

where $C = (\varepsilon - x^*)^T \eta_1 \eta_1$ and $F = \varepsilon - x^* - (\varepsilon - x^*)^T \eta_1 \eta_1$. C will represent a cost, the opposite of the utility, and F will represent a disparity or unfairness. Equation (3) appears as a scalarization of unfairness and cost with $\lambda$ (the lambda value) controlling the trade-off between utility and fairness.

In both demographic fairness and meritocratic fairness, $\Delta$ is a parameter that trades off utility against fairness.

$$\bar{\varepsilon} = \frac{\|\varepsilon\|_1}{n}$$

is the average of the elements of the exposure vector $\varepsilon$, and $$\bar{\varepsilon}^* = \frac{\|\varepsilon\|_1}{n}$$

is the average of the elements of the target exposure vector. If $$x^* = 0,$$
$$\eta_1 = \frac{1}{\sqrt{n}},$$
$$\|C\|_2^2 = n\bar{\varepsilon}^2,$$
$$\|F\|_2^2 = \|\varepsilon - \bar{\varepsilon} \cdot 1\|_2^2.$$

$\|C\|_2$ may be interpreted as the opposite of utility, since from Theorem 1 $\bar{\varepsilon}$ is an affine function of the utility with negative slope. $\|F\|_2$ can be interpreted as a demographic unfairness at item level because it measures the variance of exposure across items. Both $\|C\|_2$ and $\|F\|_2$ are minimized by the exposure module 424, which is illustrated in FIG. 5.

If $$x^* = \varepsilon^*,$$
$$\eta_1 = \frac{1}{\sqrt{n}},$$
$$\|C\|_2^2 = n(\bar{\varepsilon} - \bar{\varepsilon}^*)^2,$$
$$\|F\|_2^2 = \|\varepsilon - \varepsilon^* - (\bar{\varepsilon} - \bar{\varepsilon}^*) \cdot 1\|_2^2.$$

$\|C\|_2$ can be interpreted as a cost and $\|F\|_2$ can be interpreted as a meritocratic unfairness. The difference between $\bar{\varepsilon}$ and $\bar{\varepsilon}^*$ is positive because $\bar{\varepsilon}^*$ is a lower bound to $\bar{\varepsilon}$. The disparity term $\|F\|_2^2$ measures a variance of the difference between the actual exposure and the target exposure. If every item receives the same excess exposure with respect to the target, this is considered fair by $\|F\|_2^2$.

Figure 7:
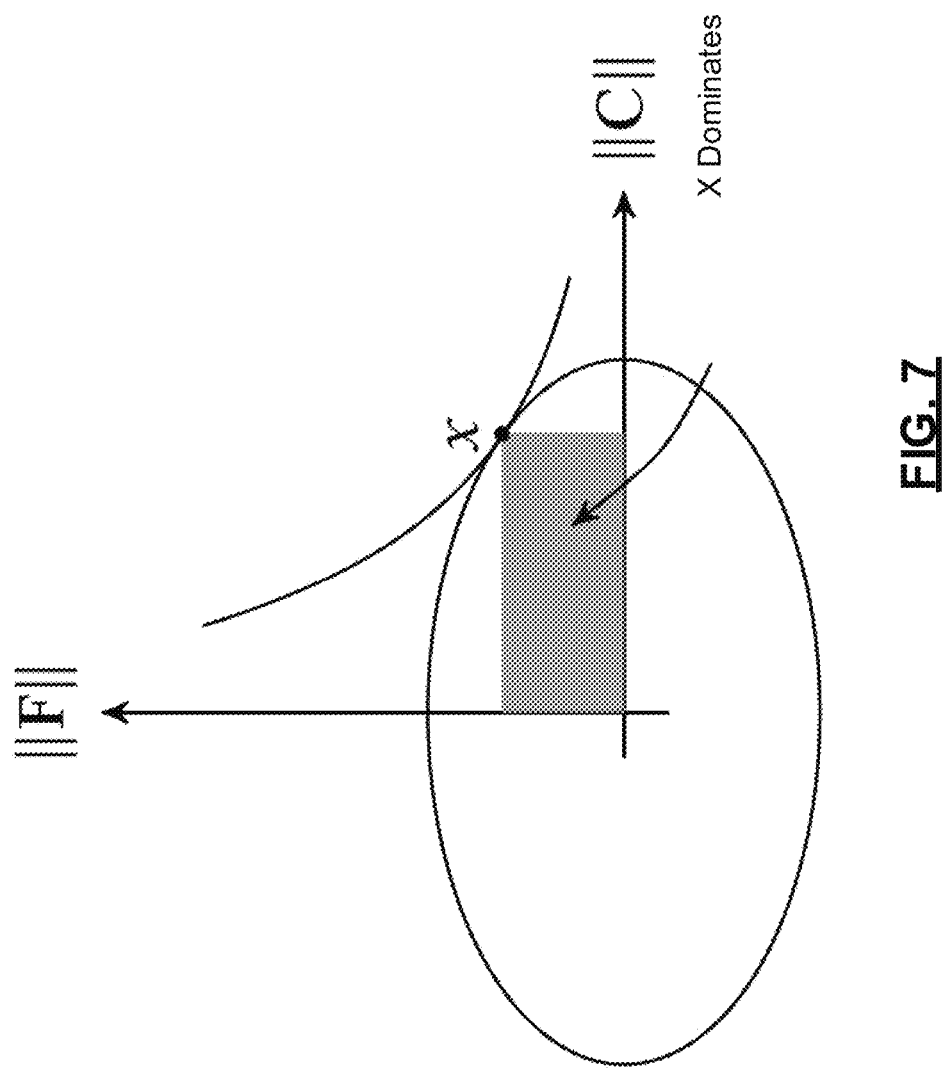
FIG. 7 is an example of a Pareto curve of utility versus fairness.

One advantage of having defined a scalarized utility-fairness metric in such a way is that the activity is thus reduced to minimizing distance that can be solved geometrically, as discussed further below. Another advantage is the non-linear scalarization of $\|C\|_2$ and $\|F\|_2$ that finds a Pareto-efficient point if minimized. This is illustrated in FIG. 7. FIG. 7 is an example of a Pareto (level) curve of UF. Minimizing UF leads to a Pareto-efficient point x for $\|C\|_2$ and $\|F\|_2$.

The level curves for UF are concentric 2-dimensional ellipses. This means that if a point is dominated, there exists a feasible point with lower UF. Thus a point with minimal UF cannot be dominated.

When the true relevances are known and $x^*=\varepsilon^*$ is chosen as the target vector, a unique optimal solution can be found by the exposure module 424 for the exposure value, independent of $\lambda$. This means that, in that case, the Pareto-set collapses to a single point and this single point is nothing else that the target exposure $\varepsilon^*$: the target exposure is feasible by construction and achieves maximum utility and maximum meritocratic fairness. Equation (2) provides an optimal policy in terms of PRP rankings. An even simpler solution is the one which cyclically permutes all relevant items in the top $n^r$ ranks and all irrelevant items in the $n-n^r$ ranks. After lcm($n^r$, $n-n^r$) delivered rankings, all relevant items will have the same exposure and all irrelevant items will have the same exposure while only having delivered PRP rankings.

When $x^*=0$ is chosen as a target vector, then even with perfectly known relevances there is a trade-off to be done between utility and fairness, utility cannot be maximized while giving to irrelevant items the same exposure as relevant items. Furthermore it is not true that delivering each ranking in $S_n$ with the same probability would lead to every item getting the same exposure. FIG. 5 shows that this is not the case and that even finding a sequence of rankings that ensure demographic fairness is non-trivial.

Unknown Relevances

In the example of unknown relevance values for the items, the target vector may be set based on expectations. A relevance distribution may be provided (e.g., stored in memory) for each item. Assuming binary relevance values (e.g., 1=relevant to query, 0=irrelevant to query), the relevance distribution is a Bernoulli distribution, characterized by one parameter, the relevance probability. The vector of relevance probabilities can be denoted by $\rho=\mathbb{E}[r]$. The relevance module 420 may determine the relevance values for the items 408, respectively, based on the relevance distributions:

$$r \sim \text{Ber}(\rho),$$

where Ber($\rho$) is a vectorial Bernoulli distribution of parameter $\rho_i$ in each dimension and with independent dimensions. This allows the relevance module 420 to determine expected values. In the following, an expectation operator $\mathbb{E}$ and a variance operator $V$ may be taken on the random variable $r$ distributed as $r \sim \text{Ber}(\rho)$.

In various implementations, random relevance values may be used.

The exposure module 424 may minimize $\mathbb{E}[\|\varepsilon - x^*\|^2_{Q(\lambda,\eta_1)}]$ the expectation of the objective metric. This quantity may be difficult to determine directly, however. Let $X$ be a random vector in $\mathbb{R}^n$ with a well-defined expectation and covariance matrix. Let $Q=Q(\lambda, \eta_1)$ and $P=P(\eta_1)$ be the change of basis matrix such that $Q=P^T M_\lambda P$. Then $$\mathbb{E}[\|X\|^2_Q] = \underbrace{\mathbb{E}[\|X\|^2_Q]}_{\text{square expectation}} + \underbrace{\lambda V[(PX)_1] + (1-\lambda)\sum_{k=2}^n V[(PX)_i]}_{\text{variance term}} \quad (4)$$

where $(PX)i$ denotes the i-th element of the vector $PX$. When setting $X=\varepsilon-x^*$ to order to minimize $\mathbb{E}[\|\varepsilon-x^*\|^2_{Q(\lambda,\eta_1)}]$, the exposure module 424 may minimize the expectation term. The variance term becomes or is near zero, when the relevance probabilities $\rho_1, \ldots, \rho_n$ come close to 0 and 1, as the variance of a Bernoulli random variable with parameter $\rho$ equals $\rho(1-\rho)$. The task of the minimization of the variance term may be the role of a relevance estimator. The ranking module 412 may focus on the expectation term only. The objective metric therefore becomes $$\widehat{UF} = \|\mathbb{E}[\varepsilon] - \mathbb{E}[x^*]\|^2_Q.$$

With DBN exposure, the items' exposures depend on the (possibly unknown) relevances of the items ranked before them.

The expected exposure for the DBN model can be expressed as:

$$\mathbb{E}[\varepsilon_i|\pi] = \gamma^{\pi^{-1}(i)-1} \Pi_{j=1}^{\pi^{-1}(i)-1}(1-\kappa\rho_{\pi(j)}).$$

The expected target exposure can be expressed as $$\mathbb{E}[\varepsilon_i^*] = \Sigma_{s=0}^{n-1} PB(s|\rho_{-i})(\rho_i \mu_{s+1} + (1-\rho_i)v_s),$$

where $\rho_{-i}$ is a vector of parameters $\rho$ excluding the i-th element, PB($\bullet|\rho$) is the pmf of a poisson binomial distribution with parameter $\rho$, and $\mu_s$ and $v_s$ respectively are a target exposure of a relevant item and the target exposure of an irrelevant item given that $s$ amongst $n$ documents are relevant.

For every ranking $\pi \in S_n$, and for every possible distribution $r \sim \text{Ber}(\rho)$, the expected utility is $$\mathbb{E}[U(\pi,r)] = \mathbb{E}[\varepsilon(\pi,r)^T r^T r] = \mathbb{E}[\varepsilon(\pi,r)]^T \rho.$$

The expectation module 424 may determine the probability mass function of the Poisson-Binomial or an approximation thereof.

Theorem 2 is that, for a DBN exposure model with parameters $\kappa \in (0,1)$, $\gamma \in (0,1)$, and for every $\pi \in S_n$ and every distribution Ber($\rho$), there is the affine relationship $$\|\mathbb{E}[\varepsilon(\pi,r)]\|_1 = \frac{1-\gamma^n \mathbb{E}[(1-\kappa)^{n_r}]}{1-\gamma} - \frac{\gamma\kappa}{1-\gamma} \mathbb{E}[U(\pi,r)]$$

This follows from Theorem 1. Let $\Pi(\rho)$ be the convex hull of all achievable expected exposure vectors:

$$\Pi(\rho) := \text{Conv}(\{E[\varepsilon(\pi,r)] | \pi \in S_n\}).$$

A second corollary is that the polytope $\Pi(\rho)$ is contained in a hyperplane with normal vector $$v = 1 + \frac{\gamma\kappa}{1-\gamma}\rho.$$

This follows from the first corollary above.

With unknown relevances, the metric analyzed by the expectation module 424 is $$\widehat{UF} = \|\mathbb{E}[\varepsilon(\pi,r)] - \mathbb{E}(x^*)\|_{Q(\lambda,\eta_1)}$$

Table 2 includes examples of the fairness and of the cost components for different values of $x^*$ when the relevances are random variables. Different choices of $x^*$ translate to the decompositions summarized in Table 2.

TABLE 2

Expressions of the fairness and of the cost components for different values of $x^*$, when the relevances are random variables

| $x^*$ | $\eta_1$ | $\|C\|_2^2$ | $\|F\|_2^2$ |
|---|---|---|---|
| 0 | $1/\sqrt{n}$ | $n\mathbb{E}[\bar{\varepsilon}]^2$ | $\|\mathbb{E}[\varepsilon] - \mathbb{E}[\bar{\varepsilon}]1\|_2^2$ |
| $\mathbb{E}[\varepsilon^*]$ | $1/\sqrt{n}$ | $n(\mathbb{E}[\bar{\varepsilon}] - \mathbb{E}[\bar{\varepsilon}]^*)^2$ | $\|\mathbb{E}[\varepsilon - \varepsilon^*] - \mathbb{E}[\bar{\varepsilon} - \bar{\varepsilon}^*]1\|_2^2$ |

When the target vector is $x^\square = 0$, the Utility-Fairness (UF) metric above may not reach the 0 value, as the exposures are positive. In the case of the second decomposition, where the target vector is the target exposure, we can still ask ourselves whether there exists a distribution over rankings such that $$\sum_{\pi \in S_n} P(\pi) \mathbb{E}[\varepsilon(\pi, r)] = \mathbb{E}[\varepsilon^*]$$

Another theorem is that, for every vectorial Bernoulli distribution Ber($\rho_1, \ldots, \rho_n$) such that there exists i≠j with $\rho_i, \rho_j \notin \{0,1\}$ yields $\mathbb{E}[\varepsilon^*] \notin \Pi(\rho)$ With a DBN, this theorem provides the knowledge that the UF metric discussed above may not be reduced to 0. To optimize the UF metric, however, the exposure module 424 may project the expected target $\mathbb{E}[x^*]$ onto the convex hull $\Pi(\rho)$. From Caratheodory's theorem, the projection can be expressed as a convex combination of n rankings, representing a distribution over n permutations.

Regarding projecting the target x* onto the convex hull $\Pi(\rho)$, a solution to minimize the proxy metric $\|\mathbb{E}[\varepsilon-x^*]\|_{Q(\lambda,\eta_1)}$ is the projection of the expected target $\mathbb{E}[x^*]$ onto the convex hull $\Pi(\rho)$. From the Hilbert projection theorem above, the projection is unique and can be expressed as $\hat{\varepsilon} = \sum_{i=1}^n \alpha_i \mathbb{E}[\varepsilon(\pi_i, r)]$.

To deliver T=1,000 rankings of items in response to a query, every m can be delivered exactly (T·$\alpha_i$) times. While the example of 1,000 rankings is provided, the present application is also applicable to other numbers of rankings. The numbers (T at) may not be integers, so integer approximations may be used. The procedure, however, may be dependent on the time horizon T. A deterministic fair scheduling algorithm or a low-discrepancy sequences algorithm may be used alternatively, which may evenly cover all n rankings with adequate proportions at every time-step.

When n is large, a brute force optimization algorithm may be difficult to run on the n! permutations, so 2 sub-problems may be solved by the exposure module 424:
  i) find a facet generated by a set of n vertices (i.e., rankings), on which the projection must lie; and
  ii) determine the convex coefficients of the projection on the facet. These convex coefficients determine a (e.g., optimal) policy as a distribution over the n vertex rankings.

Sub-problem ii) can be solved by the exposure module by executing a Quadratic Program (QP) algorithm on n coefficients for n points with the square distance as the objective function and a constraint that the convex coefficients be positive and sum to 1. Sub-problem i) may be more difficult because there are n! possible rankings. Iteration through all possible rankings to get a very good approximation of the optimal facet may not be necessary, however. The exposure vector may decrease exponentially with increasing rank. This means that two rankings which differ only on the last n−k positions will yield exposure vectors that are very close to each other when k is big. As such, it may be sufficient to work in a subset $S \subset S_n$, to provide an approximate solution. There may be numerous choices for S. For instance, S (a set of rankings) could be set such that it contains all possible permutations up to a certain rank k, or the elements of S could be sampled from a distribution on $S_n$ (e.g., Plackett-Luce, uniform). A ranking policy can be chosen to generate S and Algorithm 1 (below) will reduce it to a distribution of at most n permutations that is closer to the target than the original ranking policy.

Algorithm 1 is provided in FIG. 8 follows and is used by the exposure module 424 to determine the facet of the convex hull of the rankings (i.e. vertices) of S on which the projection of the target x* must lie and the convex coefficients of the projection on the facet. Algorithm 1 finds the projection in at most |S| steps.

In order to better understand Algorithm 1, consider again the Hilbert projection theorem. Let H be a Hilbert space, let M⊆H be a closed convex subset of H, let x*∈ H. Then ∃!$\hat{x}$ ∈ M: $\hat{x}$=arg $\min_{x \in M} \|x^*-x\|$ $\hat{x}$ is characterized by the so-called variational inequality $$\forall x \in M, \langle \hat{x}-x | \hat{x}-x^* \rangle \leq 0, \qquad (5)$$

where $\langle \cdot | \cdot \rangle$ is the inner product of H.

The vector $\hat{x}$ is the projection of x* on M and $\hat{x}$ can be written as $\hat{x}=\Pi_M(x^*)$. Equation (5) means that the hyperplane passing through $\hat{x}$ and orthogonal to $\hat{x}-x^*$ separates the space into two parts: one containing M, the other containing x*.

In terms of the above, the inner product becomes the scalar product with the anisotropy matrix $Q(\lambda, \eta_1)$. The variational inequality becomes $$\forall \pi \in S, (\hat{\varepsilon}-\mathbb{E}[\varepsilon(\pi)])^T Q(\lambda,\eta_1)(\hat{\varepsilon}-\mathbb{E}[x^*]) \leq 0. \qquad (6)$$

Algorithm 1 of FIG. 8 starts with n initial points $\mathbb{E}[\varepsilon(P)]$ generated by n initial rankings P⊆S (line 2). The projection of $\mathbb{E}[x^*]$ on Conv($\mathbb{E}[\varepsilon(P)]$) is found using a QP optimization algorithm (line 3), with the squared distance as the objective and the constraint that the convex coefficients must be positive and sum to 1. n may be small (e.g., ≤100). Then all remaining permutations are checked for violation of the variational inequality (equation 6) (line 5). If (6) is not violated by $\mathbb{E}[\varepsilon(\pi)]$, $\mathbb{E}[\varepsilon(\pi)]$ is not part of the optimal facet or is redundant and it can be discarded. If (6) is violated by $\mathbb{E}[\varepsilon(\pi)]$, P can be improved by adding π to it (line 6). Because of Carathéodory's theorem and because the target $\mathbb{E}[x^*]$ is outside the convex hull, P then contains a redundant or unnecessary permutation, that can be eliminated by running a QP optimization algorithm (line 7), thereby reducing the cardinality of P back to n (line 8).

Figure 10:
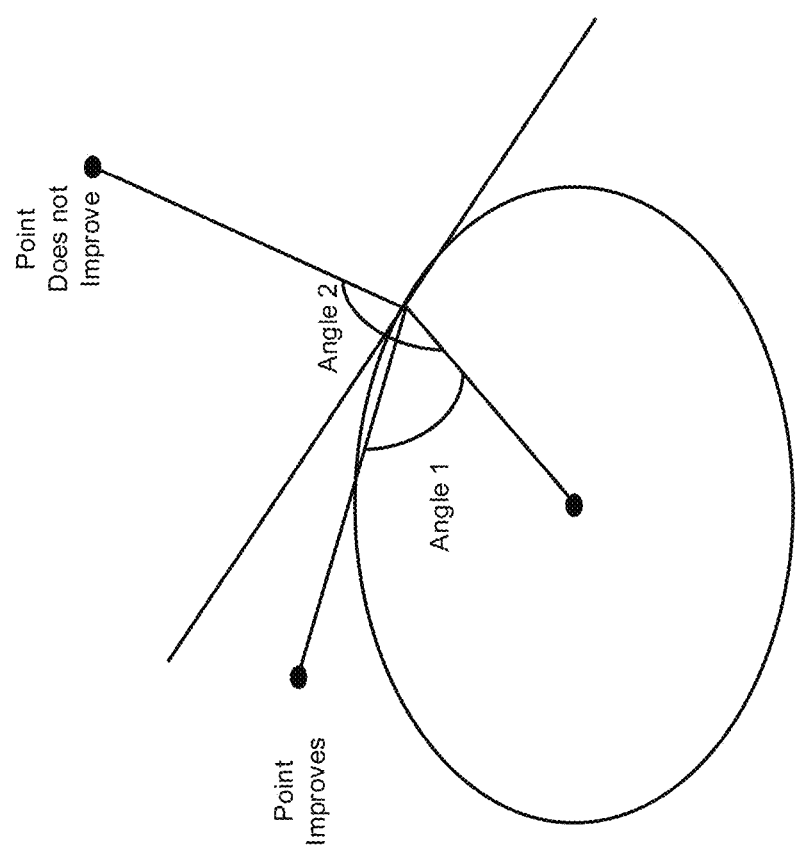
FIG. 10 includes an example graph illustrative of whether or not points provide an improvement.

Algorithm 1 may provide optimality. Let $S \subseteq S_n$. Algorithm 1 finds $$\arg \min_{\substack{\pi_1, \ldots, \pi_n \in S \\ \alpha_1, \ldots, \alpha_n}} \left\| \sum_{i=1}^n \alpha_i \mathbb{E}[\varepsilon(\pi_i, r)] - \mathbb{E}[x^*] \right\|_Q$$

under the constraints $\sum_{i=1}^n \alpha_i = 1$ and $\alpha_i \geq 0$ for all i Line 2 of Algorithm 1 involves selecting a first subset of S. Line 3 involves finding an intersection of a polytope with an ellipse formed based on the points of the subset. Line 4 enters a loop to check each point of the subset. Line 5 involves including a point in the next subset if the point improves the subset. For example, if an angle between (a) a first line from where the polytope intersects the ellipse to the point and (b) a second line from a center of the ellipse to where the polytope intersects the ellipse to the point is less than a predetermined angle (e.g., 60 degrees), the point may improve the subset. This is illustrated by example angle 1 in FIG. 10. If the angle is greater than the predetermined angle, the point may be discarded as not improving the subset. This is illustrated by example angle 2 in FIG. 10. Line 6 including the point in the next subset if the point improves the subset and discarding the point if the point does not improve the subset. Line 7 involves determining the new shape of the ellipse with the included point or without the discarded point. Line 8 involves removing one or more unneeded points.

The TREC-2020 Fairness Track dataset or another suitable dataset may be used for testing. The TREC-2020 Fairness Track dataset includes 200 queries with a variable number of items ranging from 10 to 171. A goal of estimating relevance probabilities is to estimate accurately the relevance probabilities of every item with respect to the query. Indexing and retrieval techniques can be used. One assumption may be that the training dataset information (queries, document subsets and relevance signals) is representative of the evaluation dataset.

Table 3 includes example default values for various parameters during training.

TABLE 3

Parameters' default values

| Parameter | Default value |
|---|---|
| $\lambda$ | $\frac{1}{2}$ |
| T | 1 000 |
| $\tau$ | 0.05 temperature of PL |
| $\gamma$ | 0.5 |
| $\kappa$ | 0.7 of the DBN |
| S | 10 000 samples from $U(S_n)$ |

In various implementations, the target vector x* may be varied to take either the value 0 in case of demographic fairness or the value $\mathbb{E}[\epsilon^*]$ in case of meritocratic fairness or a value between. The anisotropy intensity $\lambda$ value may be varied from 0 to 1 with more concentrated values close to 0 and 1: $\lambda \in \{0, 0.01, 0.02, 0.03, 0.05, 0.1, 0.2, 0.3, 0.4, 0.5, 0.6, 0.7, 0.8, 0.9, 0.95, 0.97, 0.98, 0.99, 1\}$. For the Plackett-Luce (PL) baseline the temperature $\tau$ may be varied from 0.0001 to 100 taking the values $\tau \in \{0.0001, 0.0002, 0.0005, 0.001, 0.002, 0.005, 0.01, 0.02, 0.05, 0.1, 0.2, 0.5, 1, 2, 5, 10, 20, 50, 100\}$. T=1000 rankings may be delivered from the distribution found by Algorithm 1. Exposures are cumulated over time and yield a final exposure vector $\epsilon$. For the choice of S in algorithm 1, 10,000 values may be uniformly sampled from $S_n$ and Sequential Quadratic Programming may be used by the exposure module 424 to determine projections on facets.

FIG. 9 jointly illustrates how the systems and methods described herein perform in comparison to a Plackett-Luce (PL) policy with varying temperature in terms of nCost and normalized unfairness. On most of the Pareto curve that is suggested by the regularity of the points, PL and the systems and methods described herein (Conv) roughly equally well, with an advantage in performance provided by the systems and methods described herein. When fairness is privileged over utility (via the lambda value), the systems and methods described herein (Conv) perform better than PL with unfairness values getting very close to 0. This advantage is especially strong for meritocratic fairness. For demographic fairness this advantage to the systems and methods described herein is slightly smaller.

Described above include systems and methods involving non-linear scalarizations of consumer cost and item unfairness in rankings, that can be expressed as anisotropic norms to be minimized. The minimization can be adapted to unknown relevances and can be formulated as a geometric projection problem, which can be solved with the projection algorithm described herein. For any given subset of rankings, the systems and methods described herein finds a (e.g., optimal) distribution that can be achieved with this subset of ranking, in terms of a scalarized objective.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A ranking system, comprising:
   an exposure module configured to, in response to receiving an input from a computing device via a network, determine, based on an anisotropic intensity value and using a Dynamic Bayesian Network (DBN) exposure model, an exposure value for ranking items for output via the computing device,
   wherein the anisotropic intensity value corresponds to a tradeoff between utility to users and fairness to item producers,
   wherein the exposure module is configured to determine a shape based on the anisotropic intensity value and determine the exposure value using the shape;
   a ranking module configured to generate a ranking of the items based on the exposure value; and
   a response module configured to transmit a response including the ranking of the items to the computing device via the network.

2. The ranking system of claim 1 further comprising an administrator module configured to set the anisotropic intensity value based on user input.

3. The ranking system of claim 1 wherein the ranking module is configured to generate the ranking of the items further based on relevance values for the items, respectively.

4. The ranking system of claim 3 wherein the relevance values are unknown.

5. The ranking system of claim 3 wherein the relevance values are known and stored in memory.

6. The ranking system of claim 1 wherein the ranking module is configured to generate the ranking further based on a frequency of the input.

7. A system, comprising:
   the ranking system of claim 1; and
   the computing device, wherein the computing device is configured to at least one of:
      display the items on a display in order according to the ranking; and
      output the items via a speaker in order according to the ranking.

8. The ranking system of claim 1 wherein the shape is an ellipse and the exposure module is configured to determine the exposure value using the ellipse.

9. The ranking system of claim 8 wherein the exposure module is configured to determine characteristics of the ellipse based on the anisotropic intensity value.

10. The ranking system of claim 8 wherein the exposure module is configured to determine the exposure value further based on a target exposure vector.

11. The ranking system of claim 10 wherein the target exposure vector includes exposures for the items, respectively, when averaged over all probability ranking principle (PRP) rankings.

12. The ranking system of claim 10 wherein the fairness to item producers is at least one of meritocratic fairness and demographic fairness.

13. A ranking method, comprising:
in response to receiving an input from a computing device via a network, determining, based on an anisotropic intensity value and using a Dynamic Bayesian Network (DBN) exposure model, an exposure value for ranking items for output via the computing device,
wherein the anisotropic intensity value corresponds to a tradeoff between utility to users and fairness to item producers;
determining a shape based on the anisotropic intensity value,
wherein determining the exposure value includes determining the exposure value using the shape;
generating a ranking of the items based on the exposure value; and
transmitting a response including the ranking of the items to the computing device via the network.

14. The ranking method of claim 13 further comprising setting the anisotropic intensity value based on user input.

15. The ranking method of claim 13 wherein generating the ranking includes generating the ranking of the items further based on relevance values for the items, respectively.

16. The ranking method of claim 15 wherein the relevance values are unknown.

17. The ranking method of claim 15 wherein the relevance values are known and stored in memory.

18. The ranking method of claim 13 wherein generating the ranking includes generating the ranking further based on a frequency of the input.

19. The ranking method of claim 13 further comprising, by the computing device, at least one of:
display the items on a display in order according to the ranking; and
output the items via a speaker in order according to the ranking.

20. The ranking method of claim 13 wherein:
the shape is an ellipse; and
determining the exposure value includes determining the exposure value using the ellipse.

21. The ranking method of claim 20 further comprising determining characteristics of the ellipse based on the anisotropic intensity value.

22. The ranking method of claim 20 further comprising determining the exposure value further based on a target exposure vector.

23. The ranking method of claim 22 wherein the target exposure vector includes exposures for the items, respectively, when averaged over all probability ranking principle (PRP) rankings.

24. The ranking method of claim 22 wherein the fairness to item producers is at least one of meritocratic fairness and demographic fairness.

25. A ranking system, comprising:
a means for, in response to receiving an input from a computing device via a network, determining, based on an anisotropic intensity value and using a Dynamic Bayesian Network (DBN) exposure model, an exposure value for ranking items for output via the computing device,
wherein the anisotropic intensity value corresponds to a tradeoff between utility to users and fairness to item producers,
wherein means for determining the exposure value is for determining a shape based on the anisotropic intensity value and determining the exposure value using the shape;
a means for generating a ranking of the items based on the exposure value; and
a means for transmitting a response including the ranking of the items to the computing device via the network.

* * * * *